United States Patent [19]

Ide

[11] Patent Number: 5,255,984

[45] Date of Patent: Oct. 26, 1993

[54] VARIABLE CHARACTERISTIC THRUST BEARING

[76] Inventor: Russell D. Ide, 122 Ridge Dr., Exeter, R.I. 02822

[21] Appl. No.: 954,144

[22] Filed: Sep. 30, 1992

Related U.S. Application Data

[63] Continuation-in-part of Ser. No. 949,225, Sep. 23, 1992, which is a continuation-in-part of Ser. No. 541,131, Jun. 4, 1990, Pat. No. 5,125,754, which is a continuation-in-part of Ser. No. 516,781, Apr. 30, 1990, Pat. No. 5,054,938, and a continuation-in-part of Ser. No. 516,977, Apr. 30, 1990, Pat. No. 5,066,144, which is a continuation-in-part of Ser. No. 309,081, Feb. 8, 1989, Pat. No. 5,137,373, and a continuation-in-part of Ser. No. 283,529, Oct. 25, 1988, Pat. No. 5,112,143, and a continuation-in-part of Ser. No. 55,340, May 29, 1987, abandoned, said Ser. No. 949,225, Continuation-in-part of Ser. No. 685,148, and a continuation-in-part of Ser. No. 309,081.

[51] Int. Cl.$^5$ .............................................. F16C 17/06
[52] U.S. Cl. ..................................... 384/122; 384/124
[58] Field of Search .............. 384/122, 124, 306, 308, 384/117, 119

[56] References Cited

U.S. PATENT DOCUMENTS

| | | |
|---|---|---|
| 1,664,878 | 4/1928 | Flintermann . |
| 1,991,461 | 2/1935 | Howarth . |
| 2,110,464 | 3/1938 | Kingsbury . |
| 2,314,703 | 3/1943 | Howarth . |
| 2,347,663 | 5/1944 | Carnahan . |
| 2,424,028 | 7/1947 | Haeberlein . |
| 3,107,955 | 10/1963 | Trumpler . |
| 3,132,908 | 5/1964 | Grotzinger . |
| 3,142,519 | 7/1964 | Abramovitz . |
| 3,160,450 | 12/1964 | Gentiluomo . |
| 3,298,751 | 1/1967 | Elwell . |
| 3,384,425 | 5/1968 | Brown . |
| 3,578,827 | 5/1971 | Smith . |
| 3,586,401 | 6/1971 | Gravelle . |
| 3,639,014 | 2/1972 | Sixsmith . |
| 3,677,612 | 7/1972 | Barnett et al. . |
| 3,971,602 | 7/1976 | Anderson . |
| 4,005,914 | 2/1977 | Newman . |
| 4,099,799 | 7/1978 | Etsion . |
| 4,227,752 | 10/1980 | Wilcock . |
| 4,335,925 | 6/1982 | Stopp . |
| 4,496,251 | 1/1985 | Ide . |
| 4,657,411 | 4/1987 | Bath . |
| 4,668,106 | 5/1987 | Gu . |
| 4,671,677 | 6/1987 | Heshmat et al. . |
| 4,676,668 | 6/1987 | Ide . |
| 4,699,525 | 10/1987 | Mizobuchi et al. . |
| 4,726,695 | 2/1988 | Showalter . |
| 4,738,453 | 4/1988 | Ide . |
| 4,738,550 | 4/1988 | Gardner . |

FOREIGN PATENT DOCUMENTS

| | | |
|---|---|---|
| 0206686 | 12/1986 | European Pat. Off. . |
| 879116 | 10/1961 | Fed. Rep. of Germany . |
| 1010959 | 6/1952 | France . |

Primary Examiner—Lenard A. Footland
Attorney, Agent, or Firm—Michael D. Bednarek

[57] ABSTRACT

A hydrodynamic bearing which includes a carrier and a plurality of bearing pads circumferentially spaced about the carrier. The carrier is formed with a series of circumferentially spaced groups of pad support openings. Each group of pad support openings includes two or more pad support openings each of which is capable of supporting a pad, but only one of which supports a pad at any one time. The carrier is designed such that the openings formed therein are supported as sets of supports such that each group of openings includes one opening of each set of openings. The carrier supports the openings such that the support of each opening within each set is substantially identical to that of the other openings in its set, but different than the support of the openings of other sets such that each set of bearing pad openings is adapted to support bearing pads for a distinct characteristic deflection.

20 Claims, 16 Drawing Sheets

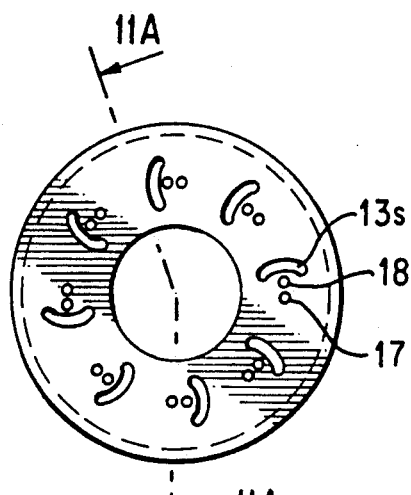 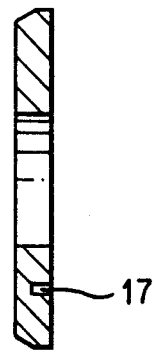
FIG. 11  FIG. 11A
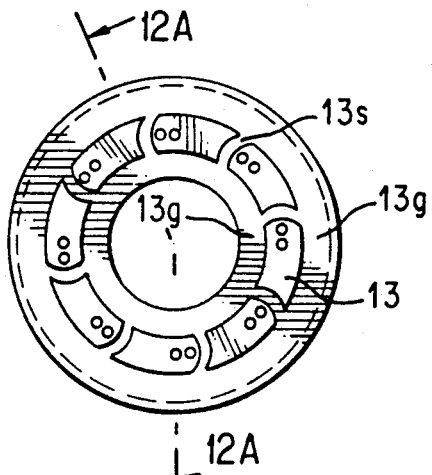 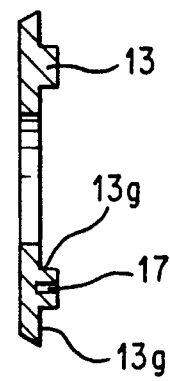
FIG. 12  FIG. 12A
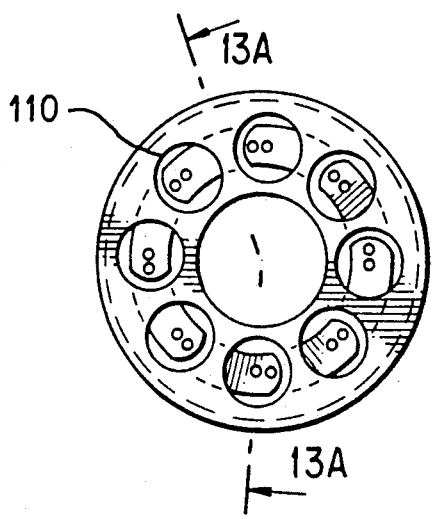 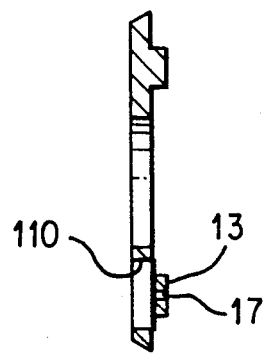
FIG. 13  FIG. 13A

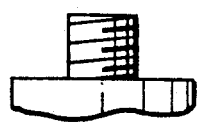
FIG. 42A
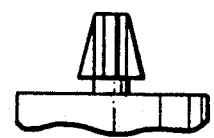
FIG. 42B
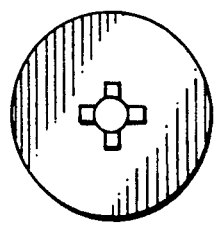
FIG. 42C
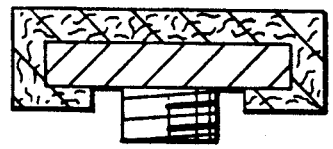
FIG. 42D
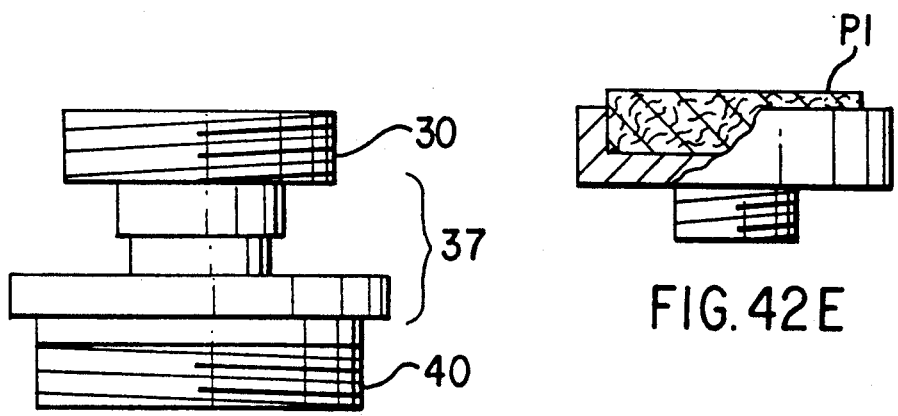
FIG. 42E
FIG. 42

VARIABLE CHARACTERISTIC THRUST BEARING

REFERENCES TO EARLIER FILED APPLICATIONS

This application is a continuation-in-part of, and claims the benefit of 35 U.S.C. § 120 with respect to the inventor's U.S. application Ser. No. 07/949,225 entitled "Pad Type Hydrodynamic Thrust Bearings Having a Modular Construction" filed on Sep. 23, 1992 which application was a continuation-in-part of U.S. application Ser. No. 07/541,131 filed Jun. 4, 1990 now U.S. Pat. No. 5,125,754 which is a continuation-in-part of applicant's copending U.S. applications Ser. Nos. 07/516,781 now U.S. Pat. No. 5,054,938 and 07/516,977 now U.S. Pat. No. 5,066,144, both filed Apr. 30, 1990 and both of which are continuation-in-part applications of applicant's U.S. application Ser. No. 07/309,081, filed Feb. 8, 1989, now U.S. Pat. No. 5,137,373 which claimed the benefit of international application PCT/US88/01841, filed May 27, 1988 and corresponding U.S. application Ser. No. 07/283,529, now U.S. Pat. No. 5,112,143, of which it was a C-I-P, filed Oct. 25, 1988 which in turn claimed the benefit of and was a C-I-P of applicant's U.S. patent application Ser. No. 07/055,340, filed May 29, 1987 and now abandoned.

The above mentioned application Ser. No. 07/949,225 filed on Sep. 23, 1992 is also a continuation-in-part of U.S. application Ser. No. 07/685,148 filed Apr. 15, 1991 which is a continuation-in-part of U.S. application Ser. No. 07/309,081 mentioned above.

FIELD OF THE INVENTION

The present invention relates to thrust bearings and more particularly to hydrodynamic pad type thrust bearings.

BACKGROUND OF THE INVENTION

Pad type hydrodynamic thrust bearings are known from the present inventor's previous U.S. Pat. Nos. 4,676,668 to Ide, 5,137,373 to Ide and 5,125,754 also to Ide. These patents each disclose movable pad thrust bearings which include spaced pads supported for deflection under load. In U.S. Pat. No. 5,137,373 the bearing can be formed in a single piece. In the other two patents, individual bearing pads are supported in a separate carrier. One of the principal advantages of these bearings is that they can be manufactured at a fraction of the cost of conventional tilt pad bearings, yet perform at least as well.

Two of the most important performance characteristics are load carrying capability which should be as large as practical and power loss due to friction which should be as small as practical. The load carrying capability of a hydrodynamic bearing and the power losses attributable to friction occurring in a hydrodynamic bearing are both directly related to film thickness. Greater film thickness results in greater load carrying capability, but also results in more friction and thus greater power consumption. In general, a thick film leads to high power losses and a thin film results in low power losses.

Film thickness is determined by the angle of attack of a pad to a shaft surface to be supported, typically a shaft runner. The angle of attack is often expressed as a ratio of distance between the leading edge and the shaft surface to be supported to the distance between the trailing edge and the shaft surface to be supported. A one to one ratio yields an angle of attack of 0° and no wedge, i.e., the leading edge and the trailing edge are equally spaced from the shaft surface to be supported. In such a case, with no wedge, there is no film and poor performance results. A ratio of 1.5:1 is considered to be a small angle of attack which results in a very thin film and minimum power loss, but low load capability.

The ideal angle of attack is, of course, application dependent, but for most applications an angle of attack between 2:1 to 5:1 is best.

A ratio of 2:1 results in a medium film thickness and power loss and also results in a medium load carrying capability. A ratio of 3:1, 4:1 or 5:1 results in a higher film thickness and greater power losses, but yields higher load carrying capability.

It should also be noted that load decreases film thickness. For a high load design, i.e., 3:1 angle, that operates with low load, the film will be thick and losses high. Thus, it is normally the case that a bearing designed for a high load application is not ideally suited for low load applications. In other words, bearings should be designed for a single application or mode of operation.

To a large extent, the problems associated with prior art hydrodynamic bearings have been solved by the bearing construction described in U.S. Pat. No. 4,676,668 to Ide, the present inventor. This bearing construction includes a plurality of discrete bearing pads press fit into a support portion. The bearing pads may be spaced from the support member by at least one leg which provides flexibility in three directions. To provide flexibility in the plane of motion, the legs are angled inward to form a conical shape with the apex of the cone or point of intersection in front of the pad surface. Each leg has a section modulus that is relatively small in the direction of desired motion to permit compensation for misalignments. These teachings are applicable to both journal and thrust bearings.

While the construction described in the present inventor's previous patent represents a significant advance in the art, commercial production has shown that improvements are possible. For instance, the shape of the bearing pads is relatively complex; and consequently somewhat difficult to mass produce, use in radial or journal bearings, and dampen.

Additionally, since the bearing pads are unitary, the entire bearing pad must sometimes be constructed out of the most expensive material necessary in any part of the bearing. The unitary construction also makes it difficult to change the performance characteristics of any particular bearing pad. This necessitates a different bearing pad for each application thus limiting the ability to standardize bearing components (i.e., use standard components in different configurations for each application) and achieve the cost and other commercial advantages associated with standardization.

The press fitting of the pads into the carrier also complicates assembly of bearings. Moreover, by virtue of this press fit, the bearing pads cannot be easily removed from the carrier. This complicates reuse of the carrier (the most substantial portion of the bearing) in the event of a failure.

Also, the bearing performs optimally in only one mode of operation and its deflection characteristics are not actively controllable.

The bearings described in applicant's previous patents can be designed based upon finite element analysis to achieve virtually any desired performance under load. However, once the bearing is designed and constructed, its performance characteristics are fixed unless some provision is made to allow adjustment of the performance characteristics. For example, in U.S. Pat. No. 5,125,754, the possibility of using piezoelectric elements to vary deflection characteristics is disclosed.

Absent some structure for varying the performance of the bearings, separate bearings must be designed for each specific application or type of application. This naturally limits the ability to construct bearings of standardized parts and consequently, increases the overall cost of manufacturing bearings and lessens, to some extent, the cost advantage achieved by the bearings. For this reason, the present inventor has found that, where possible, the bearings of the present invention should be constructed using standardized parts to take advantage of economies of scale. Accordingly, there remains a need for a bearing assembly which can be constructed from simple standardized parts and which can be used in widely varying applications.

SUMMARY OF THE INVENTION

The present invention relates to a thrust bearing which can be constructed of standardized parts to operate acceptably for various dramatically different operating conditions. More specifically, the present invention is directed to a thrust bearing which includes a carrier and a number of bearing pads supported in the carrier. The carrier is a one piece generally circular member having an axis which is coincident with the axis of the rotating shaft to be supported. The carrier is formed with a series of groups of pad support openings circumferentially spaced above the axis of the carrier. Each group of pad support openings includes two or more openings, only one of which receives a pad at any one time. The carrier includes a support structure for supporting each of the groups of pad support openings in an identical manner, but supporting each opening within each group for different deflection under low load. By virtue of this construction, the deflection of the bearings under load depends on the opening in which the pad is located.

The construction of the present invention provides two significant advantages. First, a standard carrier and standard set of pads may be used to achieve widely varying performance characteristics under load. Thus, for example, a single type of carrier and pad can be assembled to provide to a low load type bearing or a high load type bearing.

Second, the standard components can be assembled to form a multi-mode bearing which operates optimally under two or more distinct sets of operating conditions, i.e., modes of operation. This is done by locating the standard pads in different openings among the groups of openings. For example, one set of pads could be located in the first opening of each group of openings while a second circumferentially spaced set of pads could be located in the second opening of others of the groups of openings. The pads of each type would, be circumferentially spaced i.e., evenly distributed around the circumference of the carrier.

The carrier support structure can be of any of the types disclosed in the inventor's previous patents or herein. However, the currently preferred construction is a relatively simple cantilever support wherein the hole distance between the openings which support the pads and the cantilever portion vary so as to vary deflection under load.

Likewise, the pads can be of any of these structures disclosed herein. However, adequate results can be achieved by using a simple pedestal type pad since flexibility of support is provided by the carrier member.

Conceptually, the bearing pads and carriers of the present invention are designed by treating the pads and carriers as a solid piece of material and then selectively removing or adding material to the solid to cause it to deflect in a desired way under design loads. It can be readily appreciated that myriad designs are possible. Thus, it should be kept in mind that the structural features disclosed herein are generally applicable to any other bearing pad if structural conditions make this possible.

This can be done by modifying the pad shape, the support structure or both. Specifically, the pad can be modified to include grooves, cuts, rails and recesses to achieve desired deformations under load. The support structure can be designed to support the pads for movement in the six degrees of freedom (i.e., translation or movement in the +x, -x, +y, -y, +z and -z directions) and rotation about the X, Y, and Z axes so as to optimize formation of the hydrodynamic wedge, but this is not always necessary to achieve desired results.

When desired, the bearings of the present invention are designed in three dimensions to provide deflection with six degrees of freedom so as to ensure optimum wedge formation at all times. It has been discovered that a hydrodynamic bearing operates most effectively when the hydrodynamic wedge has several characteristics. The wedge should extend across the entire pad surface; the wedge should have an appropriate thickness at all times; the wedge should be shaped so as to minimize fluid leakage; the wedge should accommodate misalignment such that the major axis of the bearing is colinear or substantially parallel to the axis of the shaft; and the wedge should be formed at the lowest speed possible to prevent damage to the wedge forming surface which generally occurs as a result of shaft to pad surface contact at low speeds. If a Wedge does not form soon enough, a wear surface should be provided on the pad. Moreover, with thrust bearings, the loading among the spaced bearing pads should be equal.

The inventor has discovered that in many specific applications such as in high speed applications, it is necessary to examine and evaluate the dynamic flexibility of the entire system consisting of the shaft or rotor, the hydrodynamic lubricating film and the bearing. This analysis should also involve consideration of other conditions which could impact wedge formation. For instance, it is know that shaft to pad contact can lead to thermal crowning which will, naturally, impact the shape of the space between the pad and the shaft surface. In computer analysis of this system using a finite element model, it has been determined that it is necessary to treat the entire bearing as a completely flexible member that changes shape under operating loads. By adding more or less flexibility via machining of the basic structure, bearing characteristics may be achieved that provide stable low friction operation over wide operating ranges. A number of variables have been found to substantially affect the bearing's performance characteristics. Among the most important variables are the shape, size, location and material characteristics (e.g. modulus of elasticity etc.) of the pad and support members defined by the bores, slits or cuts and grooves formed in the bearing.

In accordance with one aspect of the present invention, the pad portion may be releasably secured to the primary support structure of the support portion and the tertiary support structure of the support portion may be releasably secured in one of the plurality of bores or openings. Also, the carrier may be configured to provide a spring or other flexible support for discrete pads mounted thereon which pads may or may not have separate support portions. For instance, the carrier may be formed with cuts and/or grooves to provide a thin beam or membrane support for each pad. The beam or membrane could be fluid dampened if desired. The support portion of each of the bearing pads is adapted to deflect under load so as to cause the pad surface of the pad portion to form a hydrodynamic wedge with respect to the rotating shaft. The support portion may have various forms including a hollow frustum, a plurality of legs formed out of a frustum, legs formed out of a cylindrical portion and legs formed out of a hollow cylindrical portion.

The construction of the present invention can be designed to obviate the disadvantages associated with previous discrete pad bearing constructions by providing a bearing which may include modular bearing pads having threads or similar type connectors for releasably securing the bearing pads to a support structure provided with a complementary connecting means. At its other end, the support structure can include threads or similar connectors for releasably securing the support structure to a complementary connector provided in the carrier to assist in assembly and disassembly of the bearing. The pad surface bearing pad portion may also be coated with a separate material such as hardened rubber or the surface may have a separate pad insert of a high performance material such as silicon carbide or CELEDYNE TM. As a result of the modular construction of the individual bearing pads, increased standardization can be achieved; standard parts can be used to vary the performance characteristics of any particular bearing pad by, for example, using different combinations of standard bearing pad support portions and bearing pad portions. Almost any shape bearing pad can be used, and it is possible to use a continuous bearing pad ring rather than discrete bearing pads. Also, the standard parts can have shapes which are much easier to manufacture. The use of standardized parts also makes it easier to vary performance to meet customer demands. Further, the modular construction reduces the cost of the bearing pads since expensive high performance materials need only be used where necessary rather than throughout the pad.

The support portion preferably has a shape which conforms to the shape of the openings in the carrier. If this shape is non-cylindrical, the pad will be precisely positioned when it is fit into the carrier.

A wear surface may be molded onto the pad when the pad support is such that wear is expected during operation, e.g., at start-up. The wear surface is preferably formed from a material having a high PV limit such as CELEDYNE TM. If necessary, a layer of surface roughness can be provided on the pad to better secure the wear surface to the pad.

The edges of the pad may be tapered to improve inlet bending.

In some instances, the requirements for a particular application may be satisfied with a simple center post design which although quite rigid is shaped or positioned to favorably influence deflection. The center post may be double curved, cylindrical, oval or any other easily manufactured shape. The post may be offset with respect to the pad portion it supports.

The present invention also relates to the use of such flexible carriers to support any of the bearing pads of the present invention.

The present invention also relates to other forms of multimode bearings which operate optimally under two or more distinct sets of operating conditions, i.e., modes of operation. This is done by providing two or more types of bearing pads in the carrier. For example one set of pads could be designed for low speed high load support and the other set of pads could be designed for high speed low load support. The pads of each type are evenly distributed around the circumference of the carrier (circumferentially spaced). In one construction, the pads designed for low load support are slightly closer to the shaft portion to be supported so that, under low loads, only these pads operate to support the shaft. Under higher loads these pads are deflected away from the shaft and another group of pads supporting the shaft. One way of achieving such an effect is by mounting the low load pads on a flexible beam or membrane support portion of the carrier which deflects under the higher loads. Alternatively, the pad support structure itself can be designed to deflect as desired. In this way the bearing can support a shaft optimally under two, three or more sets of operating conditions.

BRIEF DESCRIPTION OF THE DRAWINGS

FIG. 11 is a top view of a cylindrical blank which has undergone a first machining step.

FIG. 11A is a cross-section of the cylindrical blank of FIG. 11 along the lines indicated in FIG. 11.

FIG. 12 is a top view of the cylindrical blank of FIG. 11 which has been further machined to include facing grooves.

FIG. 12A is a sectional view of the cylindrical blank of FIG. 12 along the lines indicated in FIG. 12.

FIG. 13 is a bottom view of the cylindrical blank of FIG. 12 which has been provided with openings to define a carrier assembly according to the present invention.

FIG. 13A is a cross-section of the carrier of FIG. 13 along the lines indicated in FIG. 13.

FIG. 42 is a side view of a support structure provided with threads.

FIG. 42A is a detail, side view of a screw type modular connector.

FIG. 42B is a detail side view of a locking spline type modular connector.

FIG. 42C is a top view of the locking spline type modular connector of FIG. 42B.

FIG. 42D is a side cross section of a modular bearing pad with a screw type connector in which the bearing pad has a different material molded onto a base made of a different material.

FIG. 42E is a partially cut away side view of a modular bearing pad component in which a pad insert is supported in the bearing pad.

DETAILED DESCRIPTION OF THE DRAWINGS

Figure 1:
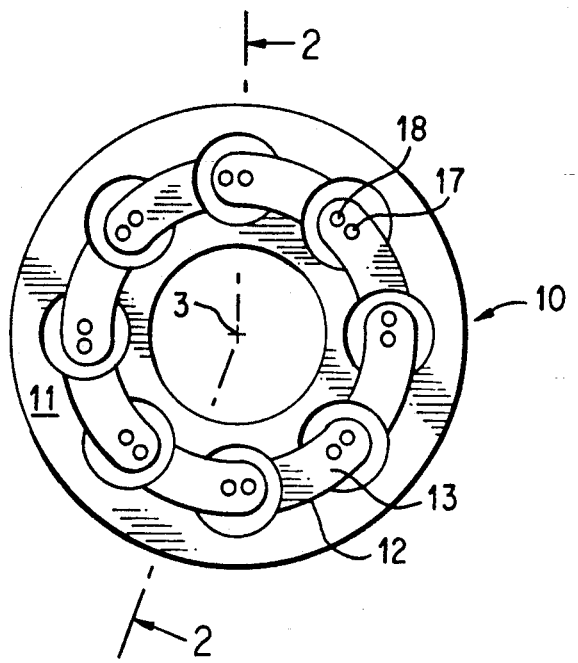
FIG. 1 is a top view of a carrier component for use in the thrust bearing assembly of the present invention.
Figure 2:
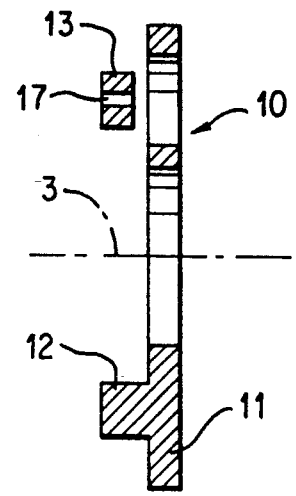
FIG. 2 is a cross-section of the carrier of FIG. 1 taken along the lines indicated in FIG. 1.
Figure 3:
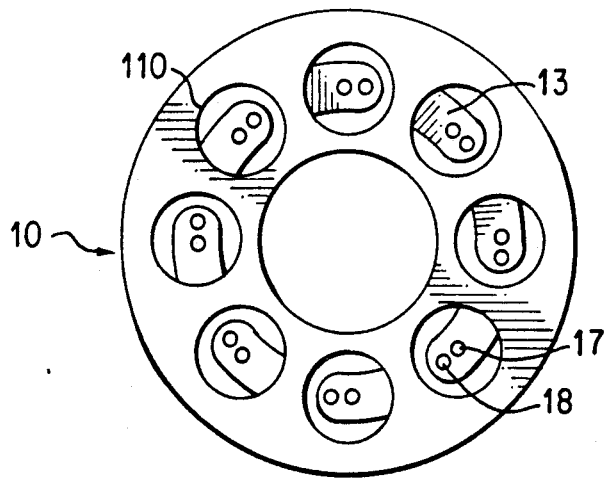
FIG. 3 is a bottom view of the carrier depicted in FIG. 1.
Figure 4:
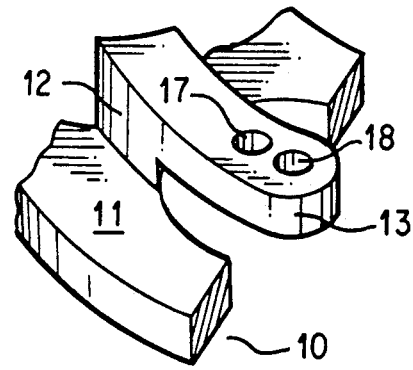
FIG. 4 is a partial perspective view of a section of the carrier depicted in FIG. 1.

The present invention relates to a hydrodynamic pad type thrust bearing of the type described in the applicant's previous patents. Such bearings typically include a number of spaced bearing pads and a support structure supporting the pads for movement, in some cases with up to six degrees of freedom. The pads may be provided with individual support structures and supported in a carrier, may be integrally formed with a carrier, or may be supported.

In the preferred embodiment of the present invention, the pads are formed separately from the carrier and the support structure is formed integrally with the carrier such that the pads are simple rigid pedestal or center-post type pads and the support structure includes flexible pad support portions.

The bearing assembly of this preferred embodiment of the present invention is constructed from two basic components: a carrier member 10 and bearing pads 26 which are supported in the carrier member.

The preferred construction of the carrier member of the present invention is illustrated in FIGS. 1-4. As shown in these figures, the carrier 10 consists of a one-piece member which includes a plurality of circumferentially spaced pad support surfaces 13. In this embodiment, the pad support surfaces 13 are in the form of a circumferentially extending beams. Each of the pad support beams 13 is supported at one end in a cantilever fashion on a stub beam 12. The stub beams 12 are in turn supported on a base 11. By virtue of this construction, the pad support beam is supported in a cantilever fashion for deflection. As with any cantilever beam, the degree of deflection will depend on the load and the distance from the cantilever support.

Each of the circumferential beams is formed with a group of pad support openings. In the illustrated embodiment, each group includes two pad support openings 17, 18. The pad support openings 17, 18 are circumferentially spaced such that within each group the opening 17 is closer to the support beam 12 than the opening 18. Thus, in effect, a pad supported in either of the two openings 17, 18 is supported on a cantilever, but a pad supported in the opening 18 is supported in a longer opening. By virtue of this construction, when the bearing assembly is subjected to a given load, the deflection of a pad supported in the opening 17 away from a surface to be supported will be less than the deflection of a pad supported in the opening 18. Consequently, pads supported in the opening 17 which are closest to the support 12, i.e., the innermost openings, will tilt at a lower angle than pads supported in the openings 18 which are further from the support, in this case, the outermost openings. In this sense, the openings 17 may be considered low tilt angle openings and the openings 18 may be considered the high tilt angle openings. As discussed above, the pads should be located in the low angle openings 17 for low load applications with relatively thin films and thus may be considered "low load openings". Likewise, the high angle openings 18 are appropriate for high load applications requiring a high angle and thus may be considered "high load openings".

In the embodiment shown in FIGS. 1-4, the carrier is a one-piece generally circular member having an axis 3 which is substantially coincident with the axis of the rotating shaft to be supported (not shown). The carrier 10 includes eight circumferentially spaced cantilever beams 13. One group of cantilevered openings 17, 18 is provided on each of the circumferential beams 13. In the embodiment illustrated in FIGS. 1-4, each group of openings includes one high load opening 18 and one low load opening 17. The groups of openings 17, 18 are circumferentially spaced about the axis 3 of the carrier 10. Each of the two openings 17 and 18 in the group is capable of receiving a bearing pad, but only one of the openings receives a bearing pad at any one time. In other words, within each group a pad is supported in either one but not both of the openings. The beam 13, stubbeam 12 and bore 11 together define a support structure which supports each of the groups of pad support openings 17, 18 in an identical manner, but supports each opening 17 and 18 within each group for different deflection under load. As a result, deflection of the bearing pads 20 under load depends on the opening 17 or 18 in which the pad is located.

Figure 5:
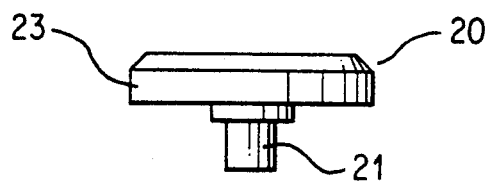
FIG. 5 is a side view of a bearing pad according to the present invention.

FIG. 5 illustrates a preferred embodiment of a pad for use in the bearing assembly of the present invention. The pad 20 is a simple center post pad having a pad portion 23 with a planar shaft support surface and a pedestal 21 extending transversely from the side of the pad portion opposite the pad surface. In this particular embodiment, the pedestal 21 has insignificant deflection characteristics. Consequently, the deflection necessary to achieve proper hydrodynamic operation of the bearing assembly must come entirely from the carrier structure 10. Of course, it is possible to use more complex pad configurations such as those disclosed herein. In the preferred embodiment illustrated in FIGS. 1-10, however, a more complex pad construction is not necessary. There are, however, various possible modifications to the basic center post construction. These are discussed below in connection with FIGS. 28-42E.

Figure 6:
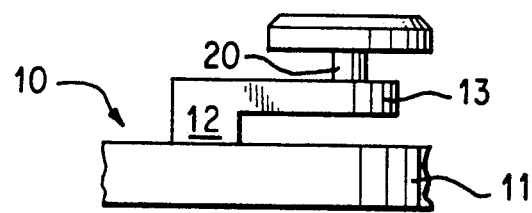
FIG. 6 is a partial side view of one embodiment of the bearing assembly of the present invention.
Figure 7:
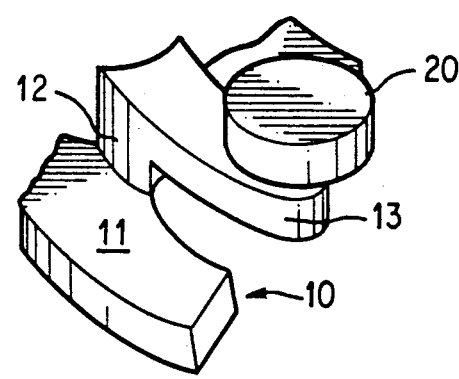
FIG. 7 is a partial perspective view of the bearing assembly of the present invention.
Figure 24:
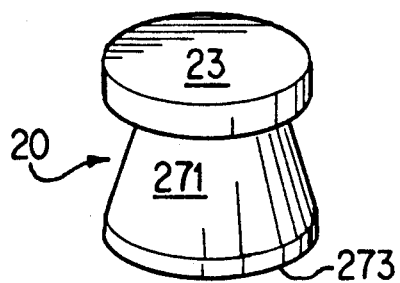
FIG. 24 is a perspective view of a frusto-conical or frustum shaped bearing pad according to the present invention.

FIGS. 6 and 7 illustrates somewhat schematically the preferred bearing assembly of the present invention in which a bearing pad 20 of the type shown in FIG. 5 is supported in the carrier 10 illustrated in FIGS. 1-4. The cantilever support of the bearing pads 20 by the carrier 10 is clearly evident. The deflection of this type of cantilever support under load is schematically illustrated in FIG. 24 and discussed below.

Figure 8:
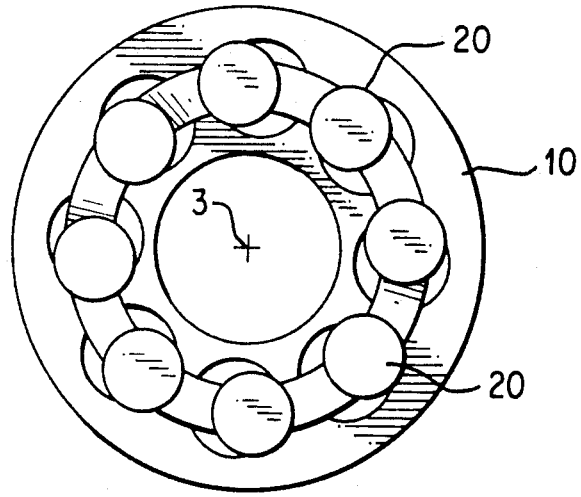
FIG. 8 is a top view of one embodiment of the bearing assembly of the present invention.

FIG. 8 shows a top view of the bearing assembly of the present invention in which the bearing pads 20 are each supported in one of the high-load openings 18 of the carrier 10.

Figure 9:
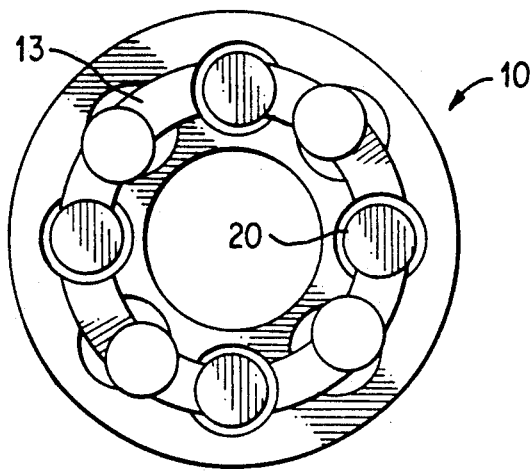
FIG. 9 is a top view of one embodiment of the bearing assembly of the present invention in which the bearing pads are arranged to provide multi-mode support.
Figure 10:
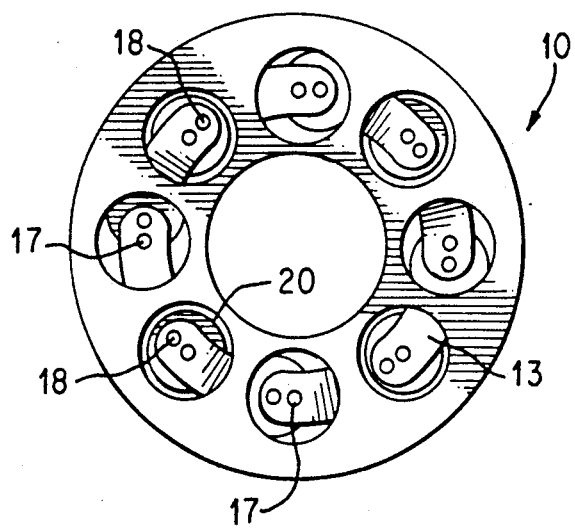
FIG. 10 is a bottom view of the bearing assembly of FIG. 9.

FIG. 9-10 illustrate an assembly of the bearing of the present invention to achieve multi-mode operation. Multi-mode bearing constructions are useful in applications involving discrete, widely varying, operating modes. For instance, an application in which a shaft sometimes rotates at a low speed and sometimes rotates at a much higher speed or an application in which the shaft is sometimes heavily loaded and other times lightly loaded. When the mode of operations vary very widely, it is sometimes difficult to design a single bearing capable of performing optimally under each set of operating conditions.

The multi-mode bearing construction solves this problem by providing separate sets of bearing pads for each mode of operation. Each set of bearing pads is circumferentially spaced about the carrier and is capable of supporting the shaft by itself under one set of operating conditions. Under operating conditions other than those for which they are designed, each set of pads provides little or no support and the shaft is supported by another set of pads. In this way, a bearing could conceivably be designed to include any number of discrete bearing pad sets to support a shaft optimally under many distinct operating conditions. In practice, however, it is difficult to design bearings to include more than about four such sets of bearings.

The construction of the multi-mode bearing is generally the same as the single mode bearing construction described above in this application except that half of the bearing pads 20 are located in high load openings 18 and the other half of the bearing pads 20 are located in low load openings 17. In operation, the pads 20 which are located in the low load openings 17 will provide most of the shaft support during low load. Conversely, during high load applications, those pads 20 which are located in the high load openings 18 will provide most of the shaft support.

While the construction of the carrier of the bearing assembly shown in FIGS. 1-10 might appear quite complex, its manufacture is actually quite simple. Indeed, as is clear from FIGS. 1 and 3, the carrier is easily moldable, that is it can be molded using a simple two-piece mold since there are no hidden openings or cavities.

The carrier can also be formed from a cylindrical blank as illustrated in FIGS. 11–13A. In this regard, it is noted that a fixed-fixed support of the type described below in connection with FIGS. 19–23 can be formed in the same way with one difference as noted below.

As shown in FIGS. 11 and 11A, the first step in machining a cylindrical blank to form a carrier of the type used in the bearing assembly of FIGS. 1–10 is to provide the appropriate groups of openings 17 and 18 and to provide an elongated slot 13s as shown in FIG. 11. If desired, the backside of the cylindrical blank may be bevelled as shown in FIGS. 11 and 11A. Moreover, to form a fixed-fixed support of the type described below in connection with FIGS. 19–22, the slots 13s are not provided.

The next step, shown in FIGS. 12 and 12A, the next step is to form facing grooves 13g on the top side of the blank. One of the facing grooves extends radially outward from the inner surface of the cylindrical blank and the other facing groove extends radially inward from the outer edge of the cylindrical blank. The provision of these facing grooves in conjunction with the previously formed slot 13s defines the circumferential beams 13 as shown in FIGS. 12 and 12A.

The final step in producing the carrier 10 is the provision of axially extending bores 110 which undercut the circumferential beam 13 and thereby define the stub 12 and cantilever support for the beams 13 as shown in FIGS. 13 and 13A.

The foregoing machining steps can be used to produce small quantities of a particular bearing or to produce prototypes for testing or to produce a prototype used to form a mold for high volume production.

While the currently preferred embodiment of the present invention is shown in FIGS. 1–10, other constructions are, of course, possible. Another bearing assembly according to the present invention, this one providing a fixed-fixed support for the openings, is shown in FIGS. 14–18.

Figure 15:
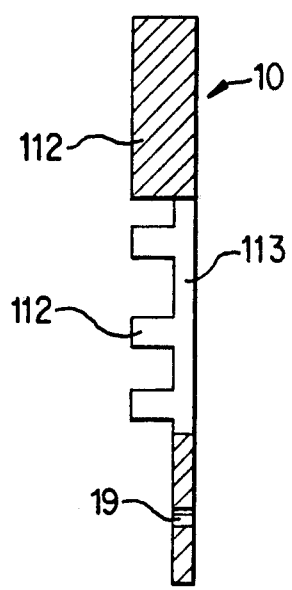
FIG. 15 is a cross-section of the carrier of FIG. 14 along the lines indicated in FIG. 14.
Figure 14:
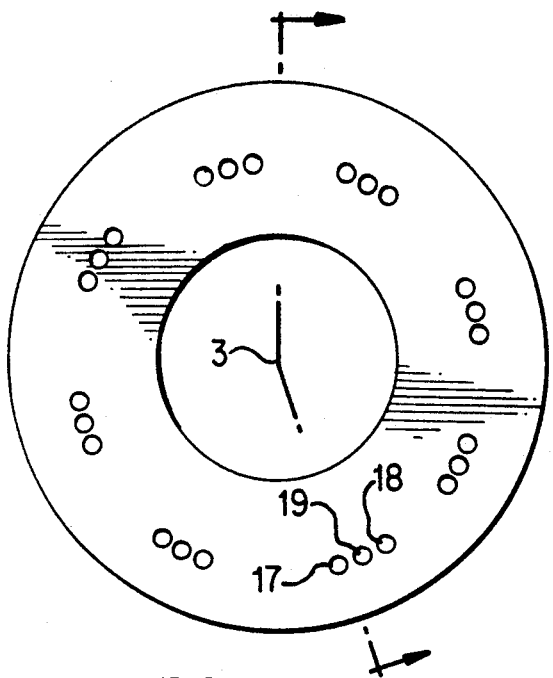
FIG. 14 is a top view of another carrier construction according to the present invention.
Figure 17:
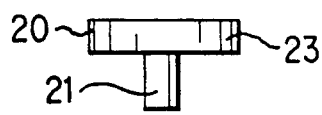
FIG. 17 is a side view of a bearing pad according to the present invention.
Figure 18:
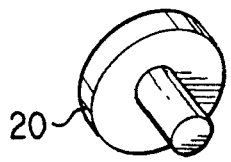
FIG. 18 is a perspective view of the bearing pad of FIG. 17.
Figure 16:
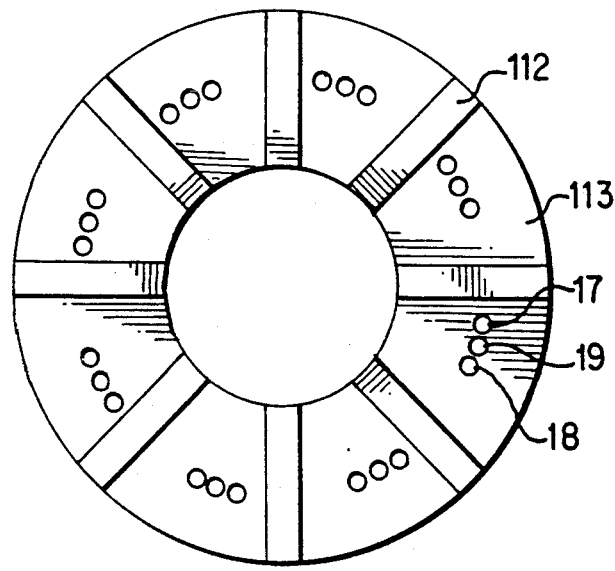
FIG. 16 is a bottom view of the carrier of FIG. 14.
Figure 19:
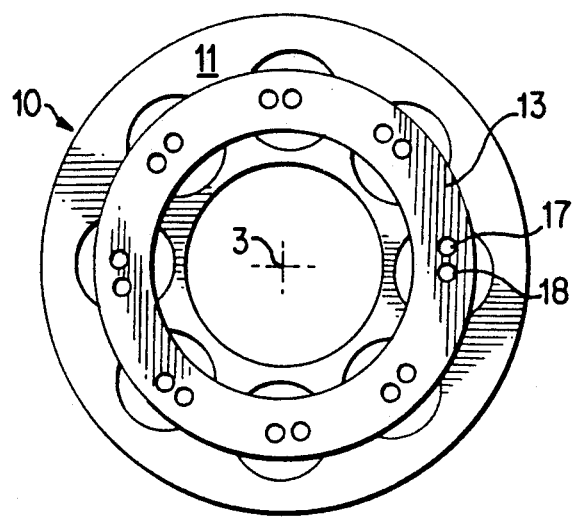
FIG. 19 is a top view of a carrier component for use in another thrust bearing assembly according to the present invention.
Figure 20:
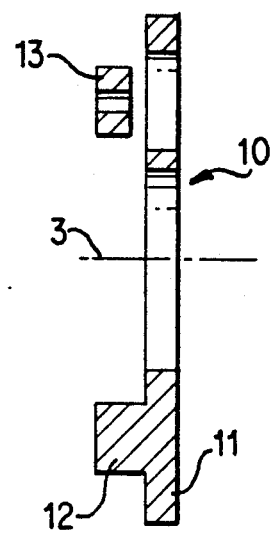
FIG. 20 is a cross-section of the carrier of FIG. 19 taken along the lines indicated in FIG. 19.
Figure 21:
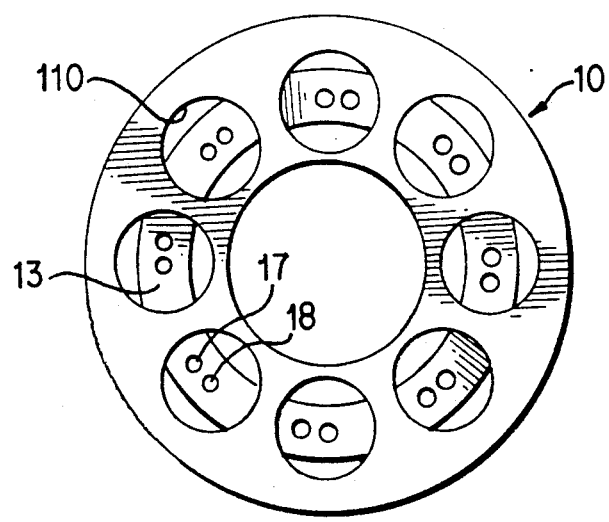
FIG. 21 is a bottom view of the carrier depicted in FIG. 19.
Figure 22:
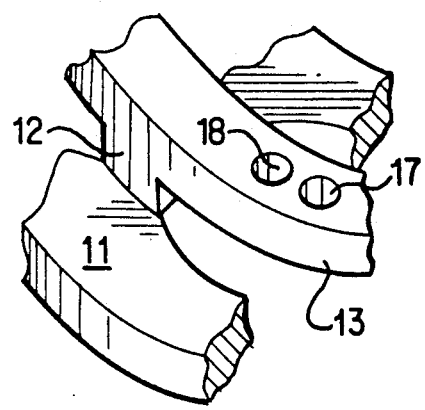
FIG. 22 is a partial perspective view of a section of the carrier depicted in FIG. 19.

The carrier 10 shown in FIGS. 14–16 is a one-piece generally circular member having an axis 3 which should be substantially coincident with the axis of the rotating shaft portion, usually a runner, to be supported. A plurality of groups of pad support openings (17, 18 and 19 together) are formed in the carrier. The groups are circumferentially spaced about the axis of the carrier 10. Each group of pad support openings includes three pad support openings 17, 18 and 19. Each pad support opening 17, 18 and 19 is capable of receiving a bearing pad, but only one of these pad support openings 17, 18, and 19 within a particular group receives a bearing pad at any one time.

Figure 23:
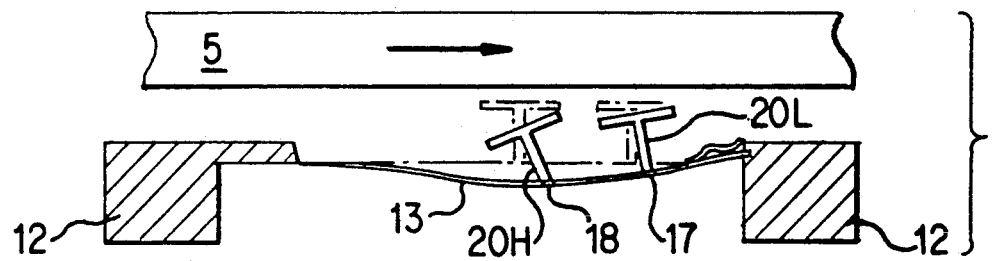
FIG. 23 is a schematic representation of the deflection of a fixed-fixed beam pad support under load.

The carrier 10 includes a continuous surface 113 in which the groups of openings are provided and a plurality of circumferentially spaced radially extending beams 112 which support the surface 113 for deflection under loading. Together the surface 113 and beams 112 comprise a support structure for supporting each of the groups of pad support openings in an identical manner. Unlike the support structure of FIGS. 1–10, the support in this embodiment is in the nature of a fixed-fixed support wherein the beam or membrane is supported at each end. The deflection of such a system under load is schematically illustrated in FIG. 23 and discussed below. While the support of each group of openings is identical, each opening 17 or 18 or 19 within each group is supported for different deflection under load. Specifically, as in the previous embodiment, the openings 17 are supported for the least amount of deflection under load, i.e., they are low load openings and the openings 18 are supported for maximum deflection under load, i.e., they are high load openings. The carrier 10 of FIGS. 14–16 differs from that of FIGS. 1–4, however, in that an intermediate load opening 19 is provided between the openings 17 and 18 such that the bearing pads may be supported for any of three different degrees of deflection under a given load.

As with the previous embodiment, a wide variety of bearing pads could be supported in the pad support openings. However, adequate results can be achieved using the simple bearing pad construction illustrated in FIGS. 17–18 which includes a bearing pad, a bearing pad portion 23 having a planar shaft support surface and a pedestal support portion 21 extending transversely from the pad portion 23 opposite the planar pad surface.

The carrier portion of another embodiment of the present invention is depicted in FIGS. 19–22. This embodiment is structurally similar to the embodiment shown in FIGS. 1–4, but provides a fixed-fixed support instead of a cantilever support. The carrier depicted in FIGS. 19–22 can be used with bearing pads of the type shown in FIG. 5 and assembled in the manner of the preferred embodiment. The difference between the carrier shown in FIGS. 19–22 and that shown in FIGS. 1–4 is that, in the carrier shown in FIGS. 19–22, the pad support openings 17, 18 are provided on a fixed-fixed support in which a continuous circumferential beam 13 is supported by stubs 12 at various circumferentially spaced locations. In this way, each of the openings 17, 18 is supported on a beam which is supported at both ends (i.e., a fixed-fixed support), not cantilevered. This difference in support naturally results in differences in deflection under load as described below. Aside from these differences in the carrier construction, the bearing assembly of FIGS. 19–22 is identical to that shown in FIGS. 1–10. The carrier 10 consists of a one-piece member which includes a continuous pad support surface 13 in the form of a circular ring. The pad support ring 13 is supported at circumferentially spaced points on stub beams 12 so as to define a circumferentially spaced series of beams supported at both ends. The openings 17, 18 are provided between adjacent beams 12. The stub beams 12 are in turn supported on a base 11. Naturally, the degree of deflection depends on the load and the distance of the particular opening from the support.

Each of the circumferential beams is formed with a group of pad support openings. In the illustrated embodiment, each group includes two pad support openings 17, 18. The pad support openings 17, 18 are circumferentially spaced such that within each group, the opening 18 is located closer to the center of the circumferential beam than the opening 17. Thus, in effect, a pad supported in either of the two openings 17, 18 is supported on a suspended beam or fixed-fixed, but a pad supported in the opening 18 is supported in a location subject to greater deflection. By virtue of this construction, when the bearing assembly is subjected to a given load, the deflection of a pad support in the opening 17 away from the surface to be supported will be less than the deflection of a pad supported in the opening 18 as illustrated in FIG. 23 below. Consequently, a pad supported in the opening 18 which is closest to the center of the beam 13, operate as high load openings and the other openings 17 operate as low load openings.

The fixed-fixed support offered by the carrier as shown in FIGS. 19-22 is quite similar to that shown in FIGS. 14-16.

Having described the construction of several embodiments, including the preferred embodiment of the present invention, the operation of the bearings of the present invention will now be described with reference to FIGS. 23 and 24.

Figure 23A:
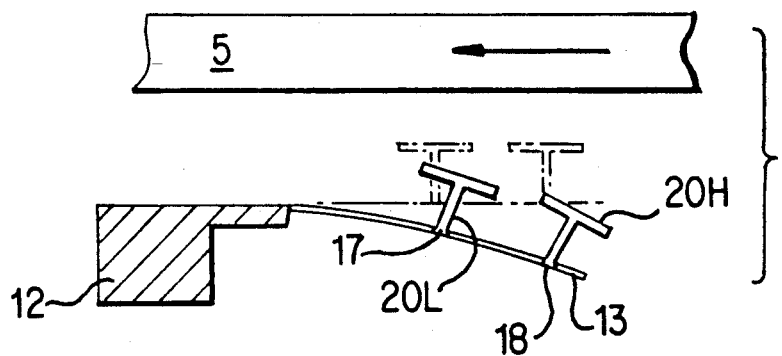
FIG. 23A is a schematic representation of the deflection of a cantilever beam pad support under load.

FIGS. 23 and 23A schematically represent the deflections under load of two types of support structures disclosed herein, namely, a fixed-fixed support and a cantilever support.

FIG. 23 shows, schematically, a fixed-fixed support system in which a beam or membrane 13 is supported on each end by beam or membrane supports 12. A runner or other portion of the shaft 5 to be supported is shown rotating in the direction illustrated by the arrow. Two bearing pads 20H and 20L are shown supported on the beam or membrane 13. It is, of course, understood from the foregoing that in actual operation only one pad will be supported on the beam or membrane 13 at any one time. In this case however, bearing pads 20H, 20L are shown in both pad support openings at one time to illustrate the difference in deflections under load.

The pad 20H is located in the high load opening 18 and the pad 20L is located in the low load opening 17. The positions of the bearing pads 20H and 20L in an unloaded state is illustrated in phantom. As shown, in the unloaded state, the bearing pads are both substantially parallel to the surface of the shaft runner 5. However, under load the beam 13 deflects as shown with the result that the pads 20H and 20L tilt in response to the deflection of the beam 13. By virtue of its location between the support 12, the high load pad 20H tilts at a greater angle than the low load pad 20L which is located near one of the beams 12. Thus, the high load pad 20H has a greater wedge ratio or angle of attack than the beam 20L. It should be understood that the deflections illustrated in FIG. 23 are greatly exaggerated for purposes of illustration.

FIG. 23A shows the deflection of a cantilever support system under load. In this case, the beam 13 is supported by a pad support 12 at only one end to define a cantilever support system. Again, a shaft runner 5 is illustrated with its direction of rotation indicated by the arrow. For purposes of comparison, the bearing assembly is illustrated with pads 20H and 20L located in both pad support openings. Again, it is understood that in operation the bearing pads are located in only one of the two openings at any one time.

As illustrated in FIG. 23A, under load, the pad 20H which is located in the opening 18 furthest from the support 12 deflects at a greater angle than the pad 20L yielding a larger wedge angle. Thus, the pad 20H is well suited for high load applications whereas the pad 20L is better suited for low load applications. Again, the deflections are greatly exaggerated for purposes of illustration.

There are other ways of obtaining multimode operation. For example, multimode operation can be achieved by modifying the deflection characteristics of the pad support structure. This can be done by using pads having different deflection characteristics as discussed below in connection with FIGS. 24-26B or by damping some of the pad's support structures as discussed below in connection with FIGS. 27 and 27B.

Figure 24A:
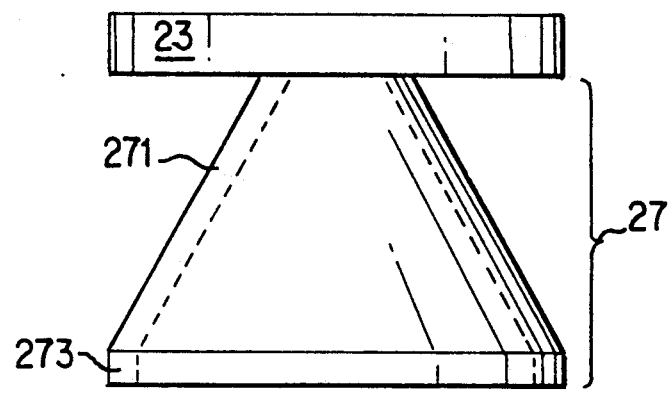
FIG. 24A is a side view of the frusto-conical bearing pad of FIG. 24 with the hidden cross-sectional lines indicated in phantom.

FIGS. 24 and 24A illustrate a frustoconical pad 20. In this embodiment, the primary support portion 271 is a continuous hollow frustoconically shaped member 271. The continuous frustoconical shape which forms the primary support portion 271 tapers toward a point located the above surface of the pad portion 23. Also, the frustoconical primary support portion 271 is supported on a single dog leg portion 273. The continuous construction of the primary support portion 271 as well as the rigid dog leg portion 273 make this bearing pad quite rigid. Such a rigid pad would generally be used in high load applications. Although not specifically shown, it should be appreciated that the bearing pad portion 23 could be formed either integrally or separately from the support portion 27. Also, the dog leg or tertiary support portion 273 could have a connecting means, such as a screw thread, formed thereon.

Figure 25A:
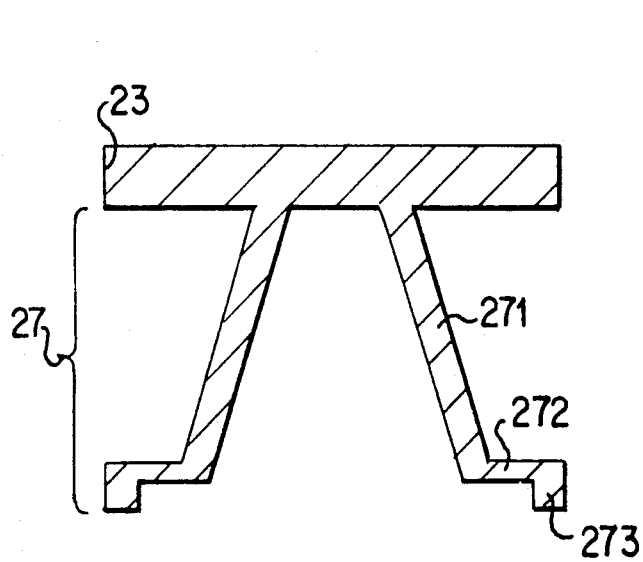
FIG. 25A is a cross-section of the frusto-conical bearing pad of FIG. 25.
Figure 25:
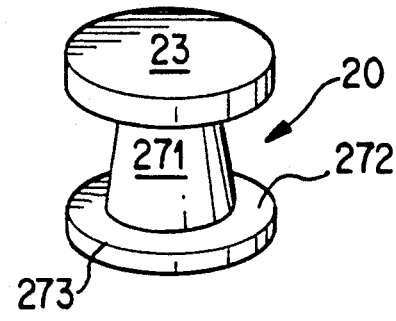
FIG. 25 is a perspective view of another frusto-conical bearing pad according to the present invention.

FIGS. 25 and 25A show another frustoconically shaped bearing pad according to the present invention. This bearing pad is similar to that of FIGS. 24 and 24A except that it includes a secondary support portion 272 in the form of a continuous membrane. As detailed below, the membrane can be divided into a plurality of beams by providing openings in it. The provision of the membrane or other secondary support portion 272 gives the support structure 27 enhanced flexibility (particularly in the vertical direction) such that the bearing pad of FIGS. 25 and 25A is more flexible than that of FIGS. 24 and 24A.

FIGS. 26-26B and FIGS. 27-27A illustrate various forms of a multimode bearing construction according to the present invention. As suggested above, multimode bearing constructions are useful in applications involving discrete, widely varying, operating modes. For instance, an application in which a shaft sometimes rotates at a low speed and sometimes rotates at a much higher speed or an application in which the shaft is sometimes heavily loaded and othertimes lightly loaded. When the modes of operation vary widely, it is sometimes difficult to design a single bearing capable of performing optimally under each set of operating conditions. The multimode bearing construction solves this problem by providing separate sets of bearing pads for each mode of operation. Each set of bearing pads is circumferentially spaced about the carrier and is capable of supporting the shaft by itself under one set of operating conditions. Under operating conditions other than those for which they are designed, each set of pads provides little or no support and the shaft is supported by another set of pads. In theory a bearing could, in this way, be designed to include any number of discrete bearing pad sets to support a shaft optimally under many distinct operating conditions. In practice, however, it is difficult to design the bearing to include more than about four such sets of bearings.

The multimode mode bearing can include two or more distinct types of bearing pads and a selective support construction for causing each set of pads to support the shaft during the operating mode for which they are designed but to provide little or no support in other operating modes. One type of selective support construction is based on the principle of load differentiation. Another type of selective support construction involves the use of actively controllable "smart" materials such as piezoelectric quartz or polymers.

Load differentiation is made possible by the fact that any two modes of operation which are sufficiently distinct to require a multimode bearing will necessarily involve distinct pad loading, i.e., one mode will involve relatively high load and the other mode will involve relatively low load. The multimode bearings of the present invention are designed such that the set of pads designed to support the shaft in the low load mode are slightly closer to the shaft portion to be supported than the set of pads designed for supporting the shaft in the high load mode. Thus, under low load operating conditions, only the set of pads designed for supporting the shaft under such conditions operate to support the shaft. The low load pads are designed or mounted on a support which is designed to deflect away from the shaft portion to be supported under high load conditions. Thus, under high load conditions, the low load pads are pushed away from the shaft portion to be supported and the shaft is supported by the high load pads while the low load pads, in their deflected position, provide little or no support.

Load differentiation can be provided in at least two ways. First, the support structure of the pads themselves may be designed such that the pads deflect away from the shaft in response to loads greater than the load for which they are designed. Alternatively or in addition, the carrier portions which support the low load pads may be designed to deflect away from the shaft in response to high loads.

Figure 26:
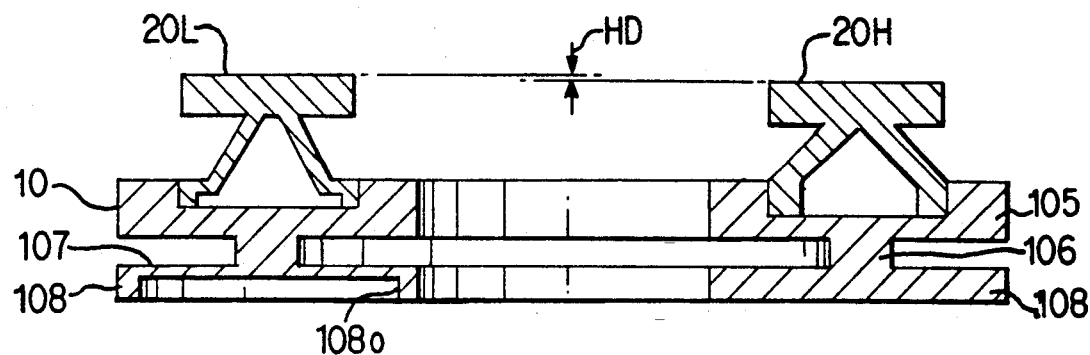
FIG. 26 is a cross-section of a multi-mode bearing according to the present invention.
Figure 26A:
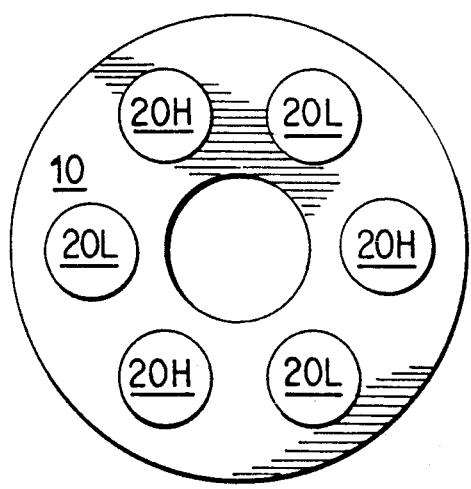
FIG. 26A is a top view of the multi-mode bearing of FIG. 26.
Figure 26B:
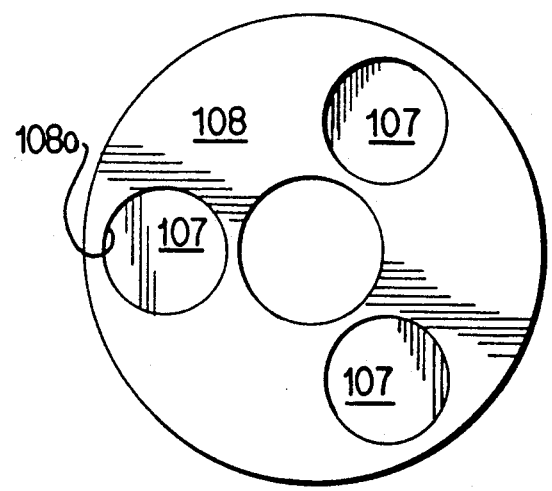
FIG. 26B is a bottom view of the multi-mode bearing of FIG. 26.

FIGS. 26-26B show a multimode bearing construction which includes two types of bearing pads 20L and 20H. The first type of bearing pad 20L is relatively flexible and is thus designed to support the shaft in a relatively low load operating mode. The second type of bearing pad 20H is relatively rigid and is thus designed to support the shaft in a relatively high load operating mode.

In the specific illustrated example, the low load bearing is similar to that shown in FIGS. 25 and 25A and discussed above and the high load bearing is similar to that shown in FIGS. 24 and 24A, also discussed above. Of course, other types of bearing pads could be used. In the bearing of 26-26B, load differentiation primarily occurs through the design of the carrier 10 member. More specifically, the carrier is designed such that each set of pads (the high load pads and the low load pads) are supported on a pad support portion 105 which is supported on a continuous circumferential ring portion 106. For the high load pads 20H the continuous circumferential portion 106 is supported on a solid base 108. However, for the low load pads 20L the solid base 108 is provided with an opening 108o such that the continuous beam 106 rests on a very thin membrane 107. By virtue of this construction, the low load pads 20L are supported on a portion of the carrier 10 which has much greater flexibility in the vertical direction as viewed in FIG. 26 than the high load pads 20H. Thus, in response to high loads applied to the low load pads 20L, the support for these pads would deflect vertically downward such that the pad surface of the low load pads 20L would deflect away from the surface to be supported. On the other hand, the carrier support for the high load pads 20H is relatively rigid and would not deflect in this manner. Hence, in response to high loads, substantially all of the support is provided by the high load pads 20H.

On the other hand, in order to ensure that the low load pads 20L provide substantially all of the support under low load conditions, the bearings are arranged such that the low load pads 20L have a pad surface which is mounted slightly higher than the pad surface of the high load pads 20H. This height difference is indicated as HD in FIG. 26. The height difference may be provided by either providing a deeper mounting bore in the carrier 10 for the high loads pads 20H or making the low load pads 20L somewhat taller. As a consequence of this height difference (HD) the surface of the low load pads contacts the surface to be supported before the surface of the high load pads 20H. Depending on the design conditions, the bearing pads and carrier support structure are designed such that, in the low-load mode, the low load pads 20L sufficiently support the entire load.

FIG. 26A illustrates the circumferential arrangement of high load pads and low load pads around the carrier 10. As illustrated therein, each set of pads i.e. the high load pad set and the low load pad set are circumferentially spaced about the major axis of the bearing. This is necessary to ensure that each set of bearing pads is capable of independently supporting the shaft portion to be supported. Additional sets of bearing pads can be provided to support the shaft in intermediate load conditions. The primary limitation on the number of such additional sets of bearing pads which can be provided is the need to provide an adequate number of bearing pads in each set to independently support the shaft and the practical necessity of keeping the bearing pad and overall bearing size reasonable. Also, the operating modes must be sufficiently distinct to allow load differentiation.

FIG. 26B shows the location of the bores 108 formed in the bottom of the carrier to form the thin membrane supports 107 under the locations of the low load pads 20L.

Figure 27:
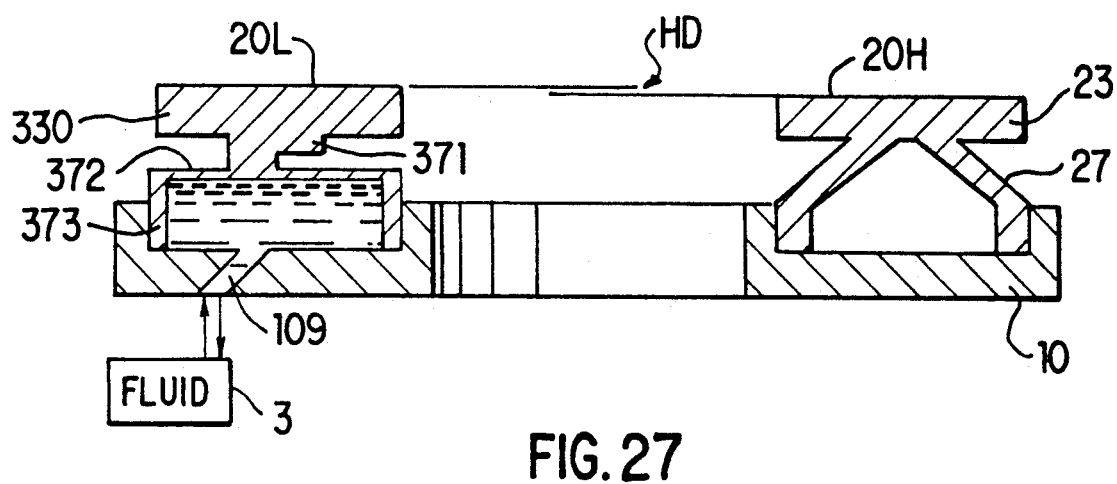
FIG. 27 is a cross-section of another multi-mode bearing according to the present invention.
Figure 27A:
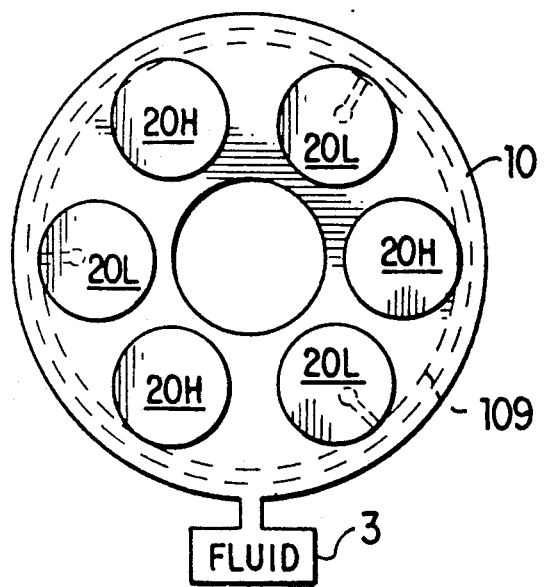
FIG. 27A is top view of the bearing of FIG. 27 with hidden fluid passages shown in phantom.

FIGS. 27 and 27A illustrate an alternative construction in which load differentiation occurs as a result of the bearing pad construction. Specifically, the bearing construction includes two types of bearing pads 20L and 20H. The first type of bearing pad 20L is relatively flexible and is thus designed to support the shaft in a relatively low load operating mode. The second type of bearing pad 20H is relatively rigid and is thus designed to support the shaft in a relatively high load operating mode. In the illustrated embodiment, the high load pad set 20H is of the type illustrated in FIGS. 24 and 24A, discussed above, and the low load pad set 20L is generally similar to that illustrated in FIGS. 4B and 4C, also discussed above. Naturally, other forms of the bearing pads can be used as desired.

The carrier 10 can be a conventional carrier which provides essentially the same support for each type of bearing pad 20L, 20H. The passage 109 formed in the carrier 10 is for a particular purpose, described below, and is not for load differentiation. The bearing pad 20L is somewhat taller than the bearing pad 20H so as to provide a height difference (HD) in the assembled state as shown in FIG. 27. In order to achieve load differentiation, the low load pad set 20L is designed so that under high load conditions, it deflects away from the shaft surface and the high load pad 20H provides most of the support necessary. To this end, the low load pad 20L has an extremely flexible support structure which includes a cylindrical primary support portion 371, a thin membrane secondary support portion 372 and cylindrical leg-like tertiary support portion 373. Naturally, this is just one example of an extremely flexible bearing pad construction. Any pad such as the flexible bearing pad constructions disclosed herein could be employed.

By virtue of the construction illustrated in FIGS. 27 and 27A, under low load conditions, the surface of the low load pads 20L first contact the shaft portion to be supported. The support structure of these bearing pads 20L are designed to adequately support the shaft under these low load operating conditions. Under higher loads, the low load pad 20L deflects away and the high load pad 20H provides most of the support for the shaft.

FIGS. 27-27A also illustrate the possibility of providing variable stiffness to a bearing pad, in this example, the low load pad 20L. Specifically, when the bearing pad 20L is mounted in the carrier 10, an enclosed chamber 373C is formed between the inside walls of support portions 372 and 373 and the bottom of the mounting bore. This chamber may be selectively provided with fluid from a fluid source 3 through a series of passages 109 such that the stiffness of the bearing can be varied. Specifically, when the chamber 373C is completely filled with pressurized fluid, the thin membrane 372 is rigidly supported such that the bearing pad 20L is much more rigidly supported. On the other hand, when fluid is evacuated from the chamber 373, the membrane 372 is free to deflect so that the bearing pad 20L is lightly supported.

In accordance with yet another aspect of the present invention, the fluid enclosed within the chamber may be an electrorheological (ER) fluid. ER fluids change viscosity in the presence of electric fields such that they can change rapidly from free flowing liquids into a high viscous, virtually solid form depending on the strength of the electrical field. When the chamber 373 is filled with an ER fluid, it is possible to provide almost continuous variation in the rigidity of the support for the thin membrane 372. In this way, the rigidity of the bearing pad 20L can be varied from anywhere between the flexible dampened support provided when the ER fluid is free flowing to the extremely rigid support when the ER fluid is highly charged and functions as a solid.

As noted above, a second type of selective support construction is based on the principle of constructing the bearing as a smart structure. Smart structures are structures which are capable of sensing environmental conditions and changing in their characteristics in response thereto. Generally, smart structures combine three types of components: a skeletal support component; a sensor component and an actuator component. The functions of each of these components are comparable to biological functions. The structural or skeletal support component functions as the framework or skeleton of the bearing and is generally formed of structural materials such as aluminum, steel, bronze, ceramics, plastics or light weight composites. The sensor component functions like the sensory nervous system and it is formed of materials tailor-made to sense and monitor changes in temperature, pressure or other physical conditions indicative of proper bearing support. Finally, the actuator component functions like the muscle system expanding, contracting or undergoing some other physical change to physically alter the skeletal support system. The smart bearing constructions of the present invention have structural components which are essentially similar to the bearing pads described heretofore. The sensor component can be conventional electronic sensors or a smart material which is physically altered by changed conditions. Similarly, the actuator component can be conventional mechanical or electric actuators or smart materials whose physical properties can be selectively altered. Piezoelectric materials are suitable as both an actuator and a sensor material. In particular, piezoelectric materials such as quartz and certain polymers generate an electric voltage when pressure is applied to them; conversely, they expand or contract when exposed to an electric field. Thus, pressure applied to piezoelectric sensors in a bearing pad will produce a voltage which can be used to signal actuators to pass a current through other piezoelectric materials in the actuator component to stiffen up or soften the structure.

Another suitable material for both the sensor and actuator component of "smart" structures is TERFENOL. TERFENOL is a new group of magnetostrictive rare earth alloys, of Iron, Terbium and Dysprosium, that produce giant dimensional changes when exposed to a magnetic field. TERFENOL has the largest magnetostriction of any material and requires only modest magnetic fields of 500-1000 Oe depending on the amount of prestressing used. In mioroseconds, the length of a 100 mm rod grows by 0.2 mm. Such changes are 100 times greater than earlier magnetostrictive and up to 20 times greater than piezoelectric materials. TERFENOL is current driven and operates at low voltages as contrasted to electrostrictive materials that are subject to undesirable arcing.

TERFENOL changes its shape due to atomic forces and it can work into mechanical impedances of 200 MPa (29,000 psi) with strains of 2000 ppm. TERFENOL is superior to all other materials in generating mechanical energy at low frequencies of 0-5 kHz. For higher frequencies of up to 20 kHz eddy current losses have to be considered and lamination is required. It transmits extraordinary amounts of energy per unit volume (30,000 J/m3). The conversion of electrical to mechanical energy occurs efficiently with magnetoelastic coupling factors greater than 0.7.

The permeability of the material is low (5-10). The relative permeability changes with mechanical stress, which means that TERFENOL can also be used as a sensor with exceedingly fast response time, since it produces electrical energy when a mechanical force is applied. Other amorphous magnetoelastic materials (iron silicon boron) are now available for sensing applications with gauge factors up to 500,000 and magnetoelastic coupling coefficients as high as 0.98.

TERFENOL has a high bandwidth of 0-15 kHz for a 100 mm rod. It operates well at low frequencies and is ideal for sonic frequencies below 1 kHz. This means that the signal goes further and generates higher resolution on the return. The Young's modulus, the resonant frequency and the sound speed of the material can be the resonant frequency and the sound speed of the material can be controlled over a wide range, using a magnetic bias field. The Young's modulus reaches twice its original value when the material is saturated.

As mentioned above, various modifications to the preferred center post pad construction of the present invention are possible. These are discussed hereinafter with reference to FIGS. 28-42E.

In the past, the pad shape of hydrodynamic bearings has been primarily dictated by manufacturing convenience. For a thrust bearing, this has traditionally meant sector shaped pads to maximize the area of support or—in the case of applicant's prior U.S. Pat. No. 4,676,668—circular pads for low cost manufacture. For radial bearings, pads having a simple cylindrical section shape have been used. In many cases, such conventional pad shapes can be supported to obtain optimum results. However, the present inventor has discovered that important performance characteristics can be achieved by modifying conventional pad shapes. Consequently, the support structure can be simplified, and in some cases, even eliminated.

Figure 28:
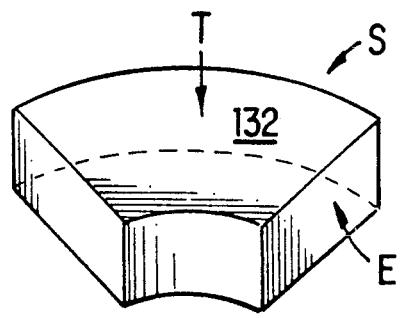
FIG. 28 is a perspective view of a sector shaped thrust pad with arrows indicating the sight lines for the top side and edge views.
Figure 29:
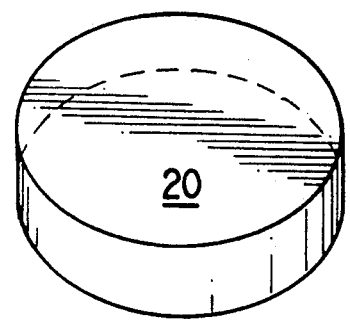
FIG. 29 is a perspective view of a circular thrust pad.

Examples of typical thrust pad shapes are illustrated in FIGS. 28 and 29. FIG. 28 shows a sector shaped pad 132. The sight lines for a top view T, an edge view E and a side view S are indicated by arrows labeled T, E and S, respectively. FIG. 29 shows a circular pad 20. These pad shapes are all characterized by uninterrupted planar surfaces and a uniform pad thickness.

Various modifications to traditional thrust pad shapes will be discussed hereinafter. In general, the effect of these modifications for any particular application can be determined through the use of finite element analysis. Such an analysis can also account for other factors which might impact wedge formation. For instance, if the support structure permits sustained shaft to pad contact, the pad will heat up. This temperature rise will result in thermal distortions or crowning of the pad. With finite element analysis these thermal effects can be predicted and used to enhance wedge formation. It should be kept in mind that any of these modifications to the shape of the pad may be used in combination or alone. Also, the modifications can be easily adapted to pads having shapes other than the specific pad shapes illustrated. Moreover, the pads may be symmetrically shaped to allow bidirectional operation or non-symmetrical to provide different operating conditions depending on the direction of rotation. The modified pad shapes discussed hereinafter may be used in combination with any support structures including those described in this application where appropriate or, when used in the proper combination, may eliminate the need for a deflecting support structure altogether.

Figure 30:
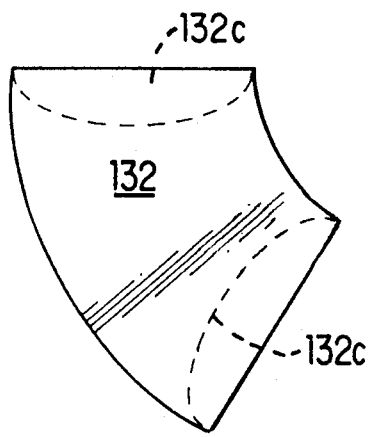
FIG. 30 is a top view of a thrust pad provided with radius cuts on both edges.

The first possible modification to the general pad shape is shown in FIGS. 30 which illustrates the modification as applied to thrust bearing.

This modification is based on finite element analysis which has shown that, in some instances, increasing the length of the edge where the lubricant enters (the leading edge) can improve bearing performance. Specifically, lengthening this edge allows more lubricant to be directed toward the pad center. To achieve this effect a radius cut may be formed on the pad surface to lengthen the leading edge. The cut may be formed either entirely through the pad or partially through the pad surface to provide a recess in the pad surface. It should be kept in mind that the provision of such a radius cut decreases the load bearing surface of the pad. Thus, there is a trade off; more lubricant but less load bearing surface.

FIG. 30 shows a top view of a thrust bearing pad 132 in which a radius cut 132C is formed as shown. In the illustrated embodiment, the cut 132C is provided on each edge of the pad 132. This is because the illustrated pad is intended for bidirectional use and the improved result is desired in both directions. If unidirectional operation is sufficient, the cut should only be provided on one edge.

Figure 31:
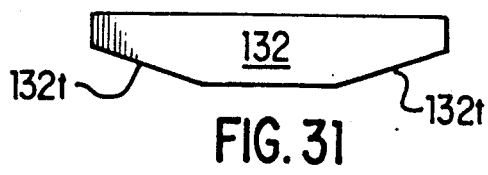
FIG. 31 is a side view of a thrust pad with tapered edges.

FIG. 31 illustrates another possible modification to the basic pad shape. Specifically, it has been learned that tapering the leading edge of the bearing pad results in increased inlet bending. This allows more lubricant to enter into the shaft-pad space which increases the load carrying capability of the pad. Complex finite element analysis using computers can predict the amount of bending needed to obtain optimum lubricant flow.

FIG. 31 is a side view along the S axis in FIG. 28 illustrating a thrust bearing pad 132 with a taper 132t formed at each edge. Again, the taper is provided at each end to allow for bidirectional operation. Of course, if unidirectional operation is sufficient, only one edge, the leading edge, should be tapered.

The basic pad shape may also be modified by providing rails on the side edges of the pads such that, under load, the pad deflects to form a channel which retains lubricant on the pad face and minimizes end or side leakage.

Figure 32:
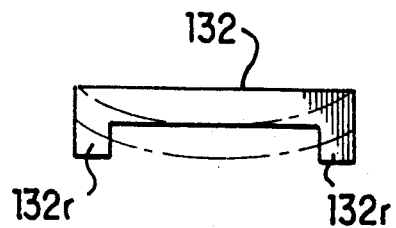
FIG. 32 is an edge view of a thrust pad provided with side edge rails.

FIG. 32 shows an edge view of a thrust bearing pad 132 provided with side edge rails 132r on the radially inner and outer edges. The deflection of this pad under load (greatly exaggerated) is indicated in phantom. As can be seen, the pad deflects under load to form a lubricant retaining channel.

Figure 33:
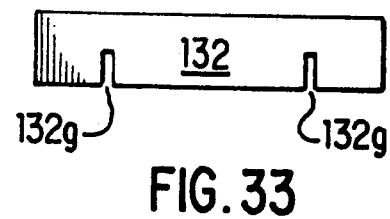
FIG. 33 is a side view of a thrust bearing pad having grooves formed in the bottom proximate the side edges.

As mentioned before with reference to FIG. 31, it is sometimes desirable to increase the inlet bending of the leading edge of a bearing pad. Another modified bearing pad shape for achieving or enhancing this desired result is shown in FIG. 33. Specifically, in addition to or instead of tapering the leading edge, a groove may be formed on the lower edge of the lower side of the pad proximate the leading edge to cause increased leading edge bending while maintaining a flatter surface. FIG. 33 shows a thrust pad 132 with grooves 132g formed in the bottom near both edges to allow bidirectional operation.

Figure 34:
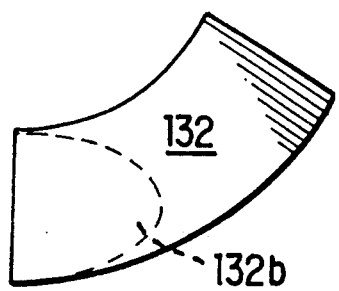
FIG. 34 shows a top view of a thrust bearing pad formed with a bottom recess indicated in phantom.
Figure 34A:
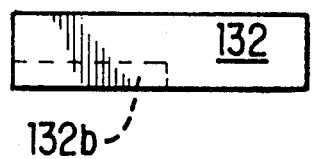
FIG. 34A shows a side view of the thrust bearing pad of FIG. 34.

Another consideration in the design of specific pad shapes is the provision of bottom recesses on the pads. Specifically, the provision of bottom recesses can cause channeling in a manner somewhat like that shown in FIG. 32 and allow inlet bending in a way such as the tapered structure shown in FIG. 31. FIGS. 34–34A show top and side views of a thrust bearing pad 132 formed with a bottom recess 132b to cause channeling. The reduced pad area also enables compressive deflections onto the bottom surface which develops a converging wedge. Since this modification is provided on only one edge of the pad 132, the pad is intended for use in a unidirectional bearing.

Figure 35:
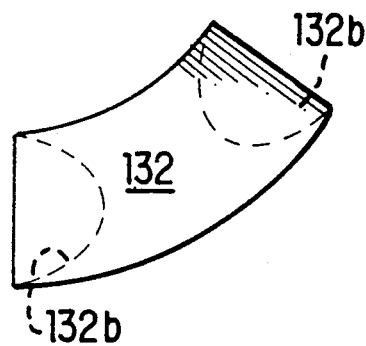
FIG. 35 is a top view of a thrust bearing pad formed with a bottom recess on each edge indicated in phantom.
Figure 35A:
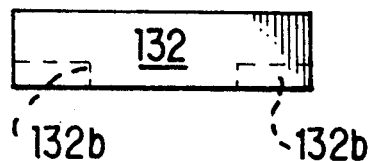
FIG. 35A is a side view of the thrust bearing pad of FIG. 35 with the bottom recesses indicated in phantom

FIGS. 35–35A illustrate bearing pad configurations similar to those shown in FIGS. 34–34A except that the bottom recesses 132b are provided at both edges of the bearing pad so as to permit bidirectional operation. Specifically, the thrust bearing pad 132 shown in FIGS. 34 and 35A includes bottom recesses 132b at each edge thereof. As is apparent by comparing FIGS. 35–35A with FIGS. 34–34A, the bottom recesses are somewhat smaller to accommodate the provision of such recesses at each edge.

Figure 36:
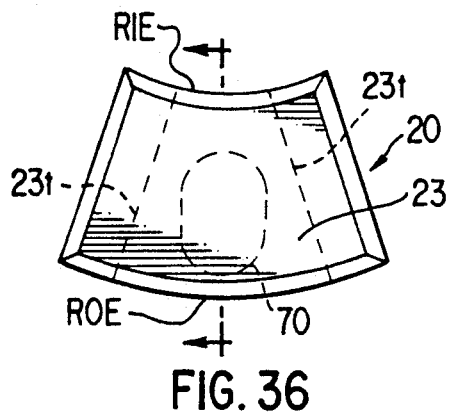
FIG. 36 is a top view of another bearing pad according to the present invention.
Figure 36A:
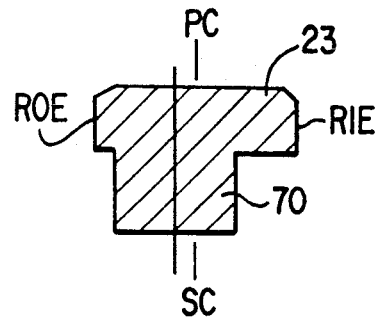
FIG. 36A is a cross-section of the bearing pad of FIG. 36 along the lines indicated by arrows in FIG. 36.
Figure 36B:
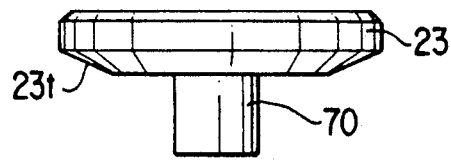
FIG. 36B is a front view of the bearing pad of FIG. 36.
Figure 36C:
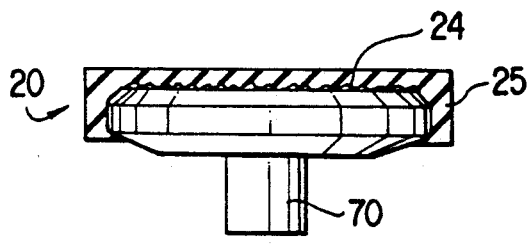
FIG. 36C is a cross-section of the bearing pad of FIG. 36 formed with a wear surface.

FIGS. 36–36C illustrate another pad construction according to the present invention. In this construction, a pad includes a sector shaped pad 23 supported on a support post 70. As best shown in FIG. 36, the support post 70 has an oval cross-section a radial dimension which is larger than its circumferential dimension. Provision of an elongated post 70 of the type shown in FIGS. 36–36C serves several functions. First, when a pad 20 of this type is mounted in a carrier 10 of the type shown in FIG. 6G having complimentary openings 101 for receiving the post 70, the pad 20 is automatically positioned in the precise location desired. In contrast, if the pad 20 were formed with a cylindrical support, it would have to be positioned in some other way.

In addition, the provision of an elongated oval post of the type shown in FIGS. 36–36C affects the support of the pad portion 23. Specifically, since the support post 70 has a radial dimension greater than its circumferential dimension, the support of the pad 23 is more rigid in the radial direction than in the circumferential dimension. In the bearing pad 20 shown in FIGS. 36-36C this affect is compounded since the sector shape of the pad portion 23 has a circumferential dimension greater than its radial dimension. Thus, as a result of both the shape of the pad portion 23 and the configuration of the support post 70, the circumferential ends of the pad portion 23 are relatively unsupported whereas the central region of the pad portion 23 is relatively rigidly supported.

An important aspect in the design of bearing pads such as those shown herein is to allow lubricant to circumferentially enter the pad region and to prevent circumferential leakage of the fluid lubricant. In the case of the bearing pads shown in FIG. 36-36C, this objective is achieved by designing the support such that under load, the radially inner edge (RIE) of the bearing pads deflect downward as viewed in FIG. 36B and the outer edge deflects upward. As best shown in FIG. 36, the support post 70 is connected to the pad portion 23 at a location which is closer to the radially outer edge (ROE) of the bearing pad than it is to the inner edge (RIE) of the bearing pad 20. Thus, the pad support surface, i.e., the surface at which post 70 contacts pad portion 23, is located radially outward of the radial dividing line. Considered another way, the geometric center of the pad PC is offset from the geometric center of the support post SC. Hence, the bearing is designed such that under load, the inner edge of the bearing deflects downward.

In operation, the downward deflection of the inner edge of the bearing pad corresponds to deflection away from the shaft supported and upward deflection of the outer edge of the bearing pad corresponds to deflection toward the shaft. The deflected orientation of the bearing pad permits lubricant to pass the radially inner edge RIE and enter the wedge region as a result of centrifugal forces and significantly inhibits the loss of fluid past the radially outer edge ROE which otherwise occurs as a result of the centrifugal forces acting on the fluid. While it is possible to optimize the design in this regard for any particular application, a general rule of thumb is that the geometric center of the support posts SC should be offset from the geometric center of the pad PC by about 10 percent.

As can be appreciated best from FIG. 36A, the support post 70 which supports the pad portion 23 is quite rigid. Indeed, this pad by itself would not permit movement of the pad portion 23 with six degrees of freedom. The present inventor has found that movement with six degrees of freedom is not always necessary to achieve adequate results. For example, in conventional tilt bearings, the individual pads need only tilt or pivot about an axis parallel to the rotor. A known rocker pivot pad has nearly zero rotational pivot stiffness. Such bearings are known to provide adequate performance, but they are more expensive and difficult to tailor to individual applications. Thus, for some applications, a pad having limited flexibility such as that shown in FIGS. 36 and 36C is acceptable.

The pad shape can be modified along the lines discussed above to achieve the disclosed results. In the case of the bearing pad 20 shown in FIG. 36-36C, one particular modification employed is the tapering of the lower circumferential edges of the bearing pads to yield increased inlet bending. This allows more lubricant to enter into the shaft-pad space which increases the load carrying capability of the pad as discussed above. Specifically, as best shown in FIG. 36B the lower edge of the pad portion 23 is tapered. Since the particular bearing pad 20 shown is intended for bidirectional operation, (i.e., it is symmetrical and can support a shaft rotation at either direction), each of the two radially extending circumferential edges, (i.e., those edges extending between the radially inner edge (RIE) and the radially outer edge (ROE)) of the pad portion 23 are provided with tapers 23t to increase inlet bending. As best shown in FIGS. 36 and 36B, the bearing pad further includes a chamfer on its top surface to permit easy entrance of lubricant.

As noted earlier, the pad construction shown in FIGS. 36-36C has limited flexibility. In many cases, this flexibility, though limited, is sufficient to achieve hydrodynamic operation. In other instances, the carrier 10 in which the pad 20 is mounted can be provided with flexibility to allow increased deflection if this is called for. In some cases, however, the relatively rigid support structure is adequate in all cases except during start up. In these instances, the present invention allows for the possible provision of a wear surface so as to avoid damage to the pad during start-up as shown in the embodiment of FIG. 36C. The objective of such a wear surface is to allow the pad to withstand wear caused during start-up. Even with a relatively rigid support structure of the type shown in FIGS. 36-36C, the pad can be designed to achieve hydrodynamic operation during steady state conditions, but the wear characteristics at start-up can cause a potential concern. By providing a wear surface the bearing is in effect designed to operate in two modes. First, at initial start-up, the bearing acts as a wear bearing wherein the shaft rubs against the pad surface. After start-up, the bearing pad operates hydrodynamically and there is little or no contact between the shaft and bearing pad surface.

While various materials can be used to provide the wear surface the preferred embodiment of the present invention comprises the use of a CELEDYNE TM resin molded around the pad as shown at 25 in FIG. 36C.

The bearing pad 20 may be formed of a wide variety of metal or plastic materials. In most common applications, however, the bearing is formed of metal typically either cast bronze or steel. Depending on the surface roughness of the pad 20, it may be desirable to add a layer of surface roughness 24 before molding the CELEDYNE TM wear surface 25 onto the pad 20. Several methods for doing this are described below.

Figure 37:
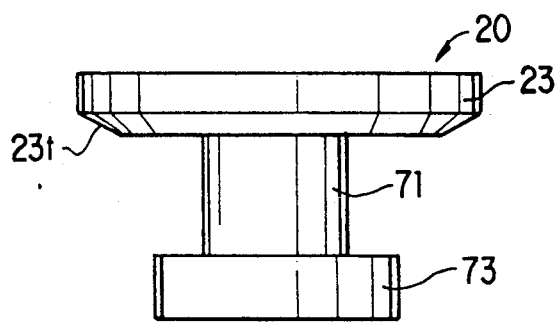
FIG. 37 is a partial front view of a bearing assembly showing one bearing pad and a part of a carrier in section.
Figure 37A:
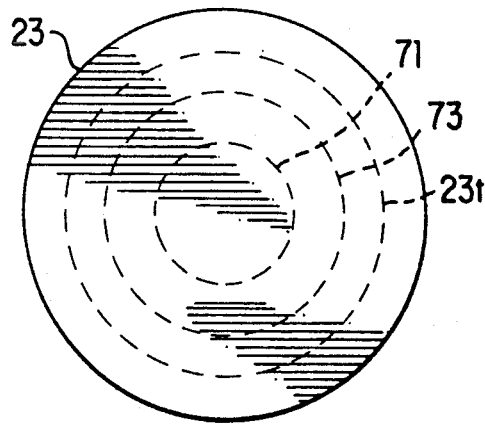
FIG. 37A is a top view of the bearing pad of FIG. 37 with some obscured features in phantom.
Figure 37B:
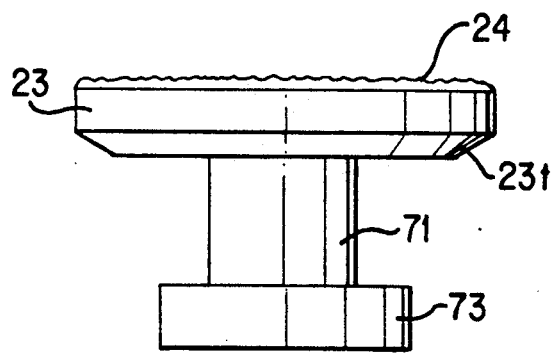
FIG. 37B is a front view of the bearing pad of FIG. 37 having a surface roughening layer formed thereon.
Figure 37C:
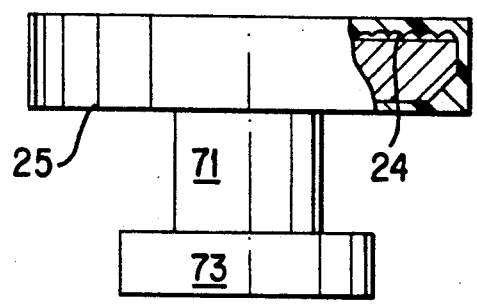
FIG. 37C is a front view, partially in section, of the bearing pad of FIG. 37 with a wear surface formed thereon.

Another bearing pad according to the present invention is disclosed in FIGS. 37-37C. In this embodiment, the bearing pad 20 includes a circular pad portion 23 which is formed with a continuous taper 23t along its lower circumferential edge. The pad portion 23 is supported by a cylindrical support post 71 which, in this case, coaxially supports the pad portion 23. The pad 20 further includes a base 73 supporting the support post 71. In this particular case, the base 73 provides no additional flexibility to the bearing pad and functions merely to support the support post 71. Thus, if desired, the support post 71 could be mounted directly in a carrier and the base 73 could be eliminated without affecting the function of the pad 20.

Alternatively, the base 73 could be formed with a threaded opening for receiving a fastening screw 41 to secure the pad 20 to a carrier 10 as shown in FIG. 37. This type of fastening screw securement means could be used to secure most of the pads 20 disclosed herein to the carriers 10 disclosed herein, but is particularly well suited to pads having a solid base.

The pad shown in FIGS. 37-37C is symmetrical. Thus, its position within a bore 101 in a carrier 20 does not affect its performance. Hence, there is no need for means for precisely positioning the pad within the bore.

The pad shown in FIGS. 37-37C is, again, quite rigid. The support post 71 rigidly supports the central region of the pad portion 23, but does not directly support the outer periphery of the pad portion 23. Accordingly, the leading edge of the bearing pad portion 23 is less rigidly supported and likely to bend to permit formation of a hydrodynamic wedge. The inlet bending effect is further enhanced by the provision of the taper 23t which as described herein, improves wedge formation.

Because of the relative rigidity of the support post 71 which supports the pad portion 23, there is a possibility that wear will occur between the pad surface and the shaft in certain applications. In these applications, if such wear is particularly troublesome, the bearing pad 20 can be provided with a wear surface 25 as shown in FIG. 37C and previously discussed. Again, the wear surface 25 can be formed of any suitable wear material. However, the currently preferred material is CELEDYNE TM resin molded onto the surface of the pad portion 23.

Since the surface of the pad portion 23 is typically quite smooth, it is sometimes difficult to cause a wear material such as CELEDYNE TM to adhere to the pad surface. A currently preferred method of adhering a resin material such as CELEDYNE TM to a bearing pad in accordance with the present invention will be described hereinafter with reference to FIGS. 37B and 37C.

To obtain proper adherence it is necessary to have a sufficiently rough surface onto which the resin is molded. This surface can be achieved by casting the part as a relatively rough surface. In the case of machined part, however, it is preferable to provide a layer of surface roughness 24 prior to molding the resin onto the pad. There are a number of ways in which this can be achieved. For example, small pieces of bronze can be melted onto the pad surface to form a rough surface. The preferred method, however, is to flame spray the pad with an aluminum/bronze (10% aluminum/90% bronze)alloy. By doing this, a relatively porus/rough surface can be achieved. This surface, during molding, allows the resin to flow into the surface craters and to lock into place. The pads are then heated slightly before they are inserted into the mold cavity, allowed to continue to heat in the mold, and then resin is injected onto the pad. The parts may then be annealed if desired. Tests have shown that the bonded surface shows good to excellent flow of material into the coating and adequate bond strength.

FIG. 37B shows a pad 20 having a surface roughening layer 24 provided thereon. Again, this surface roughened layer 24 is preferably formed by flame spraying an aluminum/bronze alloy onto the pad surface.

FIG. 37C shows a pad 20 in which the layer of resin 25 has been molded onto the pad 20 and is adhered to the pad by the surface roughening layer 24.

Figure 38:
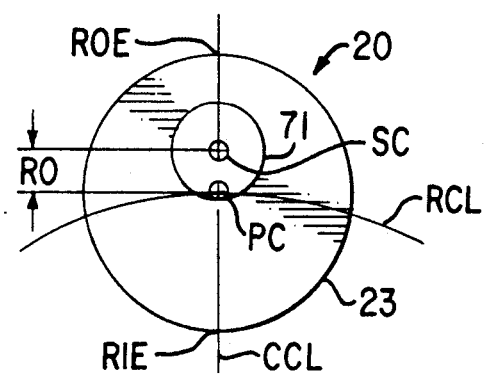
FIG. 38 is a top view of another bearing pad according to the present invention.
Figure 39:
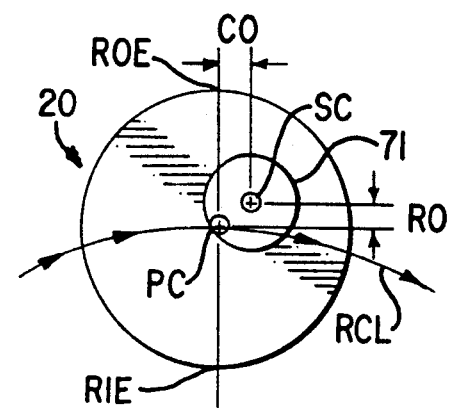
FIG. 39 is a top view of another bearing pad according to the present invention.

As previously noted, the support post 71 shown in FIGS. 37 and 37A supports pad portion 23 at the geometric center of the pad portion 23. The advantage of such an arrangement is that the pad is symmetrical. This simplifies manufacture and assembly somewhat. In other instances, however, it is preferable to have the support post offset with respect to the pad portion 23. FIGS. 38-39B depict bearing pads in which the support post 71 is offset to achieve the desired results.

Figure 38A:
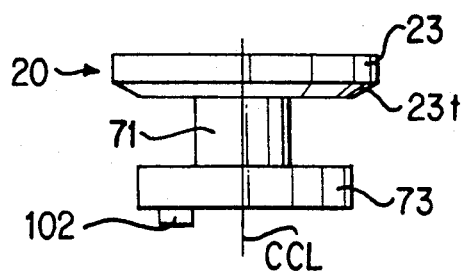
FIG. 38A is a front view of the bearing pad of FIG. 38.

In the embodiment shown in FIGS. 38 and 38A, the support post 71 has a support center SC which is radially offset from the center PC of the pad portion 23 by an amount indicated as RO. Note, however, that the support is symmetrical about the circumferential center line CCL which is defined as a radial line passing through the center of the pad portion 23 and the axis of the carrier 10 (not shown). The radial center line indicated as RCL in FIG. 38 is defined as the circle center on the axis of the carrier and passing through the pad center PC.

There are several considerations involved with a non-symmetrical pad of the type shown in FIGS. 38 and 38A. The first such consideration is that the pad 20 must be precisely positioned within the opening in the carrier because of its non-symmetrical construction. Various ways of achieving this are discussed herein, including use of locator posts and the like. In the embodiment shown in FIGS. 38 and 38A, a locator post 102 is provided on the base 73. If the carrier is provided with a complimentary opening for receiving the locator posts the bearing 20 will be precisely positioned in the carrier 10.

Because the support center SC of the support post 71 is located radially past the radial center line RCL, the pad portion 23 is supported such that the radially innermost edge RIE is supported for downward deflection under loading so as to increase bending to allow centrifugal entrance of oil. Conversely, the radially outermost edge ROE of the pad portion 23 is rigidly supported so that it forms a fluid dam to prevent centrifugal leakage of oil. Again, as a rule of thumb the point of attachment of the support post 71 to the pad portion 23 is normally shifted about 10 percent toward the outer diameter to increase bending.

The pad portion 23 is also provided with a continuous taper 23t to increase inlet bending as discussed above.

Finally, it is noted that the pad shown in FIGS. 38 and 38A is suited for bidirectional operation since the pad is symmetrical about the circumferential centerline. In other words, the deflection characteristics of the pad will not change when rotation of the shaft is reversed.

FIGS. 39-39B show another non-symmetrical pad construction. In this case, however, the pad 20 is designed for one-directional or unidirectional operation in the direction indicated by the arrows on the radial center line RCL. In the case of such one directional bearings, the point of attachment of the support post 71 to the pad portion 23 is typically offset. As a rule of thumb, the pad portion 23 should be shifted about 12% toward the trailing edge as shown best in FIG. 39. Thus, the support post has a support center SC which is offset from the center PC of the pad portion 23 circumferentially by a circumferential offset amount indicated as CO in FIG. 39 and radially by an amount indicated as RO in FIG. 39.

The radial offset serves essentially the same function as the radial offset in the bidirectional bearing shown in FIGS. 38-38A and described above. The circumferential offset CO is provided to improve inlet bending by making the leading edge less rigidly supported. The pad portion 23 also includes a continuous taper 23t to improve inlet bending. Again, like the embodiment of FIGS. 38 and 38A, the embodiment of FIGS. 39-39B includes a locator post 102 to allow the pad 20 to be precisely positioned within the carrier 10.

Figure 39A:
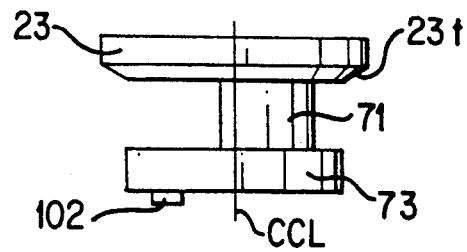
FIG. 39A is a front view of the bearing pad of FIG. 39.
Figure 39B:
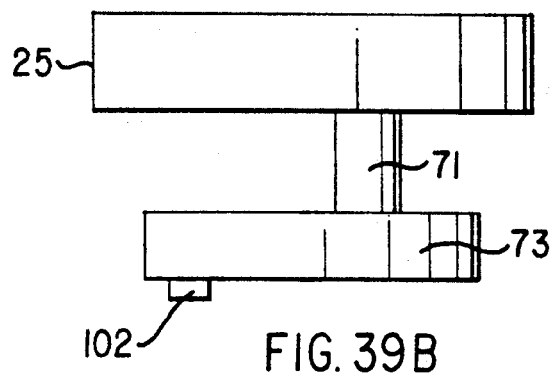
FIG. 39B is a front view of another bearing pad according to the present invention.

FIG. 39B shows a slight modification to the bearing pad of FIGS. 39 and 39A. Specifically, the pad 20 is provided with a wear surface 25. Again, the wear surface is preferably provided by molding a CELEDYNE ™ resin onto the pad portion 23. In the embodiment shown in FIG. 39B, the support post 71 is also significantly thinner, and hence, more flexible than the support posts 71 shown in FIGS. 39 and 39A.

It should be noted that, support posts described herein can have thin, thick or moderate diameters depending on viscosity, load, speed, envelope and general operating requirements. In addition, the operating requirements can be modelled using finite element analysis to determine the optimum dimensions for any particular application.

Figure 40:
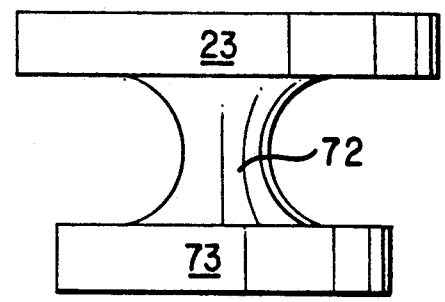
FIG. 40 is a front view of another bearing pad according to the present invention.

FIG. 40 shows another pad 20 according to the present invention. The pad 20 includes a pad portion 23, a support portion 72 and a base 73. Again, the base 73 is designed to be mounted in a bore 101 in one of the carrier constructions 10 disclosed herein. In this case, the base 73 is formed with a thread 40 as discussed above in connection with FIGS. 42 and 11B, for example. The support 72 of the pad in this case is formed with a continuously curved surface which is thinnest at the central portion of the support 72 and flares out toward both the pad portion 23 and the base 73. Geometrically, this complex shape is roughly equivalent to the shape of the hole in a doughnut or, more technically, the shape enclosed within a torus or annulus which is a double-curved surface generated by revolving a circle about a straight line axis which does not contain the center of the circle. The purpose of the complex shape of the support portion 72 is to increase flexibility of the center region of the support post 72 and relieving stress from the end regions at which the post 72 joins the pad portion 23 and the base 73. These regions might otherwise be subject to stress concentrations. By virtue of this construction, the pad 20 has a tendency to tilt more easily about the center of the support portion 72 to improve deflection. The support portion 72 may be coaxial with the pad portion 23, to simplify manufacture and assembly. Alternatively, the support portion may be offset either radially or both radially and circumferentially to achieve the aforementioned functional advantages.

Figure 41A:
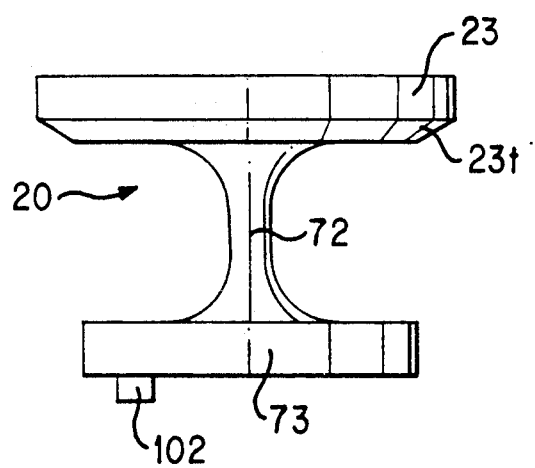
FIG. 41A is a front view of another bearing pad according to the present invention.
Figure 41B:
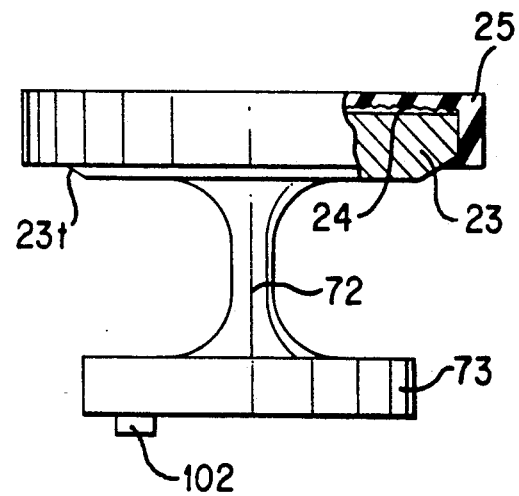
FIG. 41B is a front view of another bearing pad according to the present invention.

FIGS. 41A-41B disclose another bearing pad according to the present invention. This bearing pad construction is similar to that shown in FIG. 40 and described above. Specifically, the bearing pad 20 includes a pad portion 23, a base portion 73 and a support portion 72. The support portion 72 again flares in a continuous curve toward both the pad portion 23 and the base 73. In this case, however, the center region of the support portion 72 is somewhat elongated such that the shape of the support 72 cannot, strictly speaking, be described as the shape defined as the void left in the center region of a torus. Nonetheless, the support portion 72 achieves the same effects of providing maximum flexibility in the center region of the support 72 and relieving stress and reducing flexibility at those portions of the support 72 nearest the pad portion 23 and the base 73.

The pad portion 23 is provided with a continuous annular taper 23t at the lower edge thereof. As noted earlier, the provision of such a taper improves inlet bending.

Further, the base 73 includes a locator projection 102 for precisely positioning the pad 20 with the bores 101 of a carrier. Of course, such a locator post is especially useful when the post center is offset from the pad center.

As shown in FIG. 41B, the bearing pad 20 may be provided with a wear surface 25. Again, the wear surface 25 is preferably formed by molding CELEDYNE ™ to the pad portion 23 as shown in FIG. 41B. In addition, if necessary to assure proper adherence, a surface roughening layer 24 may be provided on the surface of the pad portion 23 prior to molding of the resin or other material onto the pad portion 23.

One particularly important aspect of the present invention is the disclosure of easily machinable pad shapes. Specifically, the circular pad shapes of the type disclosed in FIGS. 37-41B can be readily formed from cylindrical bar stock using a lathe. Pad shapes which can be formed using a lathe provide a significant advantage over known constructions in which complex machining or casting must be performed both in terms of production cost and the cost and complexity of manufacturing prototypes. In regard to the offset constructions, it is noted that the pad would have to be lathed on more than one axis to form such configurations.

An important aspect of the present invention is the disclosure of machinable bearing shapes i.e., bearing shapes which can be produced by machining a piece of heavy walled tubing or similar cylindrical journal using standardly available machining techniques. Such bearings are characterized by the fact that they are formed from a piece of heavy walled tubing or similar cylindrical journal through the provision of bores, slits and grooves. The advantage of such bearings is that it is easy to manufacture prototypes and to modify these prototypes after testing. Naturally, when the bearings are to be mass produced, using, for example, molding or casting techniques, different manufacturing considerations may dictate different shapes. It is important to recognize that changes in shape affect bearing performance.

Another manufacturing consideration is ease of molding. Naturally, most of the bearing constructions of the present invention are capable of being molded by some molding technique. However, only certain shapes can be injection molded in a simple two-piece mold, i.e., a mold which does not include cams. Another advantage of the bearings of the present invention is that the bearings can be constructed with easily moldable shapes which are defined as shapes which can be injection molded using a simple two-piece mold. An easily moldable shape generally is characterized by the absence of "hidden" cavities which require cams for molding.

Easily moldable thrust bearings are characterized by the fact that they can be molded with a single seam line such that, for example, when viewed only from the top and bottom, all surfaces are visible.

It should be noted that any of the bearing pad configurations disclosed herein can, if desired, be used as part of a modular system. This is done by, for example, forming the pad portion and the support structure as separate connectable pieces and/or providing a means for releasably securing the support structure to the carrier.

As noted above, one aspect of the present invention resides in the modular construction of bearings. Specifically, for any of the bearing pads described herein the pad portion 23 may be formed separately from the support portion and provided with a connector which cooperates with a complementary connector in the support portion to releasably or non-releasably secure the pad portion to the support portion during manufacture to form a bearing pad. The connector may be in the form of a thread formed on the upper end of the pad support portion. If a complimentary threaded bore or screw receiving portion is formed in the pad portion the pad portion can be releasably screwed onto the support portion to form a complete bearing pad. Naturally, any known complementary connectors can be employed to connect the pad portion to the support portion. Moreover, the pad may be either releasably secured, i.e., secured in a manner which enables repeated release and re-securing in a normal manner, or non-releasably secured to the pad portion. For instance, the pad portion may be press fit onto the support portion; the pad portion may be cam-locked onto the support portion (non-releasable); the pad portion may be keyed onto the support portion (releasable); the pad portion may be snap fit onto the pad portion (generally non-releasable). When a wear surface such as a polymeric, rubber pad or CELEDYNE TM portion is desired, it may be molded or otherwise formed directly on the support structure. Examples of connectors are shown in FIGS. 42A–42E and discussed below.

Forming the pad portion and the support portion separately offers considerable advantages over previously known unitary constructions. For example, different pad portions may be associated with any particular support portion so that standard pad portions and standard support portions may be combined to provide a wide variety of bearing pads suitable for use in numerous applications. Thus, through the provision of a predetermined number X of standard bearing pad portions and a predetermined number Y of standard support portions, X times Y variations of bearing pads can be constructed. Accordingly, virtually any desired performance characteristic can be obtained. The versatility of the modular system can be further increased through the use of spring-like beam mounted carriers as discussed below.

The standard pad portions and support portions can be varied according to shape, material and size to yield desired performance characteristics. For example, the pads can be formed of polymeric materials, metal, ceramic or composites.

Conceptually, the design of any of the bearing pads of the present invention is based upon the addition and/or removal of material from selected portions of the support structure to alter the deflection characteristics of the bearing pad. In this way, the bearing pads may be viewed as a piece of putty from which material is taken or added to in selected areas to increase or decrease the rigidity of the support structure to achieve desired deflection under design conditions. As discussed in detail below, the carrier may also be designed in this way.

Thus, another important advantage of the present invention is the disclosure of bearing pads which are formed separately from the carrier. Such constructions make it possible to use standard carriers 10 to achieve a wide variety of results using a relatively limited number of pads. Although the base portions of a number of the pads shown herein are described as simple cylindrical bases which can be mounted in the bores, it should be understood that the base can be threaded, press fit, adhered with an adhesive or the like to the carrier.

In accordance with another aspect of the present invention, the carrier portion 10 of the bearing may be formed so as to provide a deflectable or deflecting support for the bearing pads 20. Essentially, this involves providing structural features (beams, membranes and the like) in the carrier structure such that the carrier operates as a flexible support.

FIG. 42 illustrates one form of modular bearing pad support portion for use in the modular bearing pad construction contemplated by the present invention. The support portion includes a threaded section 30 above the primary support portion and threaded extension 40 of the tertiary support portion. These two threaded sections 30, 40 can be received in complementary threaded bores in the bearing pad portion and carrier member, respectively. Thus, the modular construction shown in FIG. 42 is adapted to be releasably secured to the carrier and bearing pad. Of course, any known complementary connectors can be used.

Although the modular constructions illustrated in FIG. 42 includes a relatively wide based threaded connecting construction. Other types of modular components and connections are possible. FIGS. 42A–42E illustrate several such components and connections.

Specifically, FIG. 42A illustrates the upper portion of a modular support portion of the type shown in FIG. 42 in which a threaded securing post is provided rather than the wide based threaded member shown in FIG. 42. Naturally, such a post could be provided as an alternative to the wide based threaded members illustrated in FIGS. 42. FIGS. 42B and 42C illustrate a splined snap lock which can be used as an alternative to the threaded member illustrated in FIG. 42A. Of course, the male portion of the connector could be formed on the pad rather than the support structure. An example of such a construction is illustrated in FIGS. 42D and 42E shows a support structure with a female connecting portion formed therein. FIG. 42D further illustrates a composite pad having a structural base formed of one material (generally metal) and a cap of another type of material (rubber, polymer or CELEDYNE TM) molded thereon. FIG. 42E shows a bearing pad which includes a separate pad insert PI made of a different material than the remainder of the bearing pad. The pad insert could be made of any high performance bearing material such as, for example, CELEDYNE TM silicon carbide, bronze, hardened rubber, a polymer or some actively controllably "smart material" such as a piezoelectric quartz or polymeric material.

Because the remainder of the pad does not contact the shaft portion to be supported, it can be formed of a less expensive material.

In addition to the illustrated constructions, other possible constructions include a leur lock, a cam lock, a twist lock or any known releasable securing means. Moreover, although not specifically illustrated, it is contemplated that in certain instances the modular components can be non-releasably secured to one another such by for example press fitting, gluing, welding or any other known construction.

What is claimed is:

1. A thrust bearing for supporting a rotating shaft, the thrust bearing comprising:
 a carrier and a plurality of substantially planar bearing pads supported in the carrier;
 the carrier comprising a one-piece generally circular member having an axis which is substantially coincident with the axis of the rotating shaft to be supported, a plurality of groups of pad support openings formed in the carrier, the groups of openings being circumferentially spaced about the axis of the carrier, and each group of pad support openings including a plurality of openings all of which are capable of receiving a bearing pad, but only one of which receives a bearing pad at any one time, a support structure for supporting each of the groups of pad support openings in an identical manner, but supporting each opening within each group for different deflection under load, whereby deflection of the bearing pads under load depends on the opening in which the pad is located.

2. The bearing of claim 1, wherein a locating projection is provided on one of the bearing pads support portions and the carrier and the other of the pad support portion and the carrier includes a projection receiving opening for receiving a projection so as to precisely position the support portion with respect to the carrier member.

3. The bearing of claim 1, wherein the bearing pad is threadably connected to the carrier.

4. The bearing of claim 1, wherein the bearing pad is connected to the carrier via a spline-lock connection.

5. The bearing of claim 1, wherein each support portion of the plurality of bearing pads includes a primary support portion, a secondary support portion and a tertiary support portion.

6. The bearing of claim 1, wherein each of the bearing pads includes a pad portion and a support portion and a wear surface is formed on the pad portion of each of the bearing pads, the wear surface being formed of a different material than the pad portion.

7. The bearing of claim 1, wherein the bearing pads include a sector shaped pad portion having two circumferential edges and at least one of these circumferential edges is tapered at its lower end.

8. A bearing of claim 1, wherein the bearing pads include a circular pad portion having a lower edge and the lower edge is continuously tapered.

9. A hydrodynamic bearing comprising:
a carrier member and a plurality of bearing pads supported on the carrier member, the bearing pads each including a shaft support surface and a pad support member, the carrier member comprising a planar pad support surface formed with a plurality of groups of openings for receiving the pad supporting member of the bearing pads, each group of openings including a plurality of openings all of which are capable of receiving a bearing pad, but only one of which receives a bearing pad at any one time, and a carrier support member supporting the pad support surface such that the openings within each group of openings are supported for different deflections under load.

10. The bearing of claim 9, further comprising a distinct wear surface formed on the pad support surface of each bearing pad of a material different than the pad portion.

11. A variable characteristic hydrodynamic thrust bearing adapted to support a rotating shaft, the bearing comprising:
a carrier member, the carrier member having a plurality of groups of openings formed therein, the groups of openings being spaced about a predetermined axis, each group of openings comprising at least two openings;
a plurality of bearing pads, one bearing pad being secured in one and only one of the openings of each group of openings formed in the carrier, each of the bearing pads comprising a pad portion having a planar shaft support surface and a support portion supporting the pad portion, the pad portion being secured into one portion of the support portion and another portion of the support portion being secured in one of said plurality of bores;
and the support portions of the carrier and each of the bearing pads together supporting the pads such that, under load, the bearing pads deflect so that they form a hydrodynamic wedge with respect to the shaft.

12. The hydrodynamic bearing of claim 11, wherein each pad is threadably connected to a support portion.

13. The hydrodynamic bearing of claim 11, wherein each pad portion is releasably secured to the support portion by spline-lock connection.

14. The hydrodynamic bearing of claim 11, wherein the pad surfaces of all the bearing pads lie substantially in a common plane when the bearing is not loaded, said plane being substantially parallel to the plane of the shaft portion to be supported.

15. The hydrodynamic bearing of claim 11, wherein the pad includes two distinct portions formed of different materials, at least one portion being formed of a different material that the support portion.

16. The hydrodynamic bearing of claim 11, wherein the pad surface is non-circular.

17. The hydrodynamic bearing of claim 11, wherein a locating projection is provided under the pad portion and the support portion and the other of the pad portion and the support portion includes a projection receiving opening for receiving the projection so as to precisely position the non-circular bearing pad with respect to the support portion.

18. The hydrodynamic bearing of claim 11, wherein a locating projection is provided on one of the bearing pad support portions and the carrier and the other of the pad portions and the support portion includes a projection receiving opening for receiving the projection so as to precisely position the support portion with respect to the carrier member.

19. A multi-mode hydrodynamic bearing for supporting a shaft which rotates in two or more distinct modes, the multi-mode bearing comprising:
a carrier, the carrier having a plurality of groups of openings formed therein, each group of openings including at least two openings each of which is capable of receiving a bearing pad, but only one of which is capable of receiving a pad at any one time;
a plurality of sets of bearing pad support openings, each group of bearing pad openings including one member of each set of bearing pad openings, each set of bearing pad openings being identically supported by the carrier;
the support of the bearing pad openings of each set of bearing pad openings being substantially identical to that of other bearing pad openings in its set, but different than the support of the bearing pad openings of other sets such that each set of bearing pad openings is supported by the carrier for a distinct characteristic deflection;
whereby the pad openings are supported such that each set of bearing pad openings supports bearing pads which in turn support the rotating shaft for rotation in the mode for which it is designed but provides insignificant support during other modes of rotation.

20. A variable characteristic hydrodynamic thrust bearing for supporting a rotating shaft, the bearing comprising:

a carrier, the carrier comprising a plurality of groups of beam-mounted pad support surfaces and a unitary support structure for supporting each of the groups of pad support surfaces, the support structure being formed with a plurality of cuts and grooves so that each of the groups of pad support surfaces are flexibly mounted;

each of the groups of pad support surfaces including two or more pad support surfaces each of which is capable of supporting a bearing pad, but only one of which can support a bearing pad at any one time;

a plurality of bearing pads, each bearing pad being supported on one of the beam-mounted support surfaces of each group of beam-mounted support surfaces each of the bearing pads including a pad surface and a support surface which is mounted on the pad support surface of the carrier; and the carrier supporting the pads such that under load, the pad surfaces form a hydrodynamic wedge with respect to the rotating shaft.

* * * * *